US009420490B2

(12) United States Patent
Jia et al.

(10) Patent No.: US 9,420,490 B2
(45) Date of Patent: Aug. 16, 2016

(54) SYSTEMS AND METHODS FOR SEAMLESS DATA STREAM TRANSFER DURING BAND SWITCH BETWEEN WIRELESS STATIONS

(71) Applicant: QUALCOMM Incorporated, San Diego, CA (US)

(72) Inventors: Zhanfeng Jia, Belmont, CA (US); Shu Du, Milpitas, CA (US); Sandip HomChaudhuri, San Jose, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 139 days.

(21) Appl. No.: 13/791,786

(22) Filed: Mar. 8, 2013

(65) Prior Publication Data

US 2014/0254349 A1   Sep. 11, 2014

(51) Int. Cl.
| | |
|---|---|
| H04W 28/04 | (2009.01) |
| H04W 28/02 | (2009.01) |
| H04B 7/02 | (2006.01) |
| H04L 1/04 | (2006.01) |
| H04L 12/893 | (2013.01) |
| H04L 12/801 | (2013.01) |
| H04L 5/00 | (2006.01) |
| H04W 88/06 | (2009.01) |
| H04L 12/707 | (2013.01) |
| H04W 40/12 | (2009.01) |

(52) U.S. Cl.
CPC ............... *H04W 28/04* (2013.01); *H04B 7/02* (2013.01); *H04L 1/04* (2013.01); *H04L 5/001* (2013.01); *H04L 47/34* (2013.01); *H04L 47/40* (2013.01); *H04W 28/0252* (2013.01); *H04B 7/022* (2013.01); *H04L 5/0037* (2013.01); *H04L 45/24* (2013.01); *H04W 40/125* (2013.01); *H04W 88/06* (2013.01)

(58) Field of Classification Search
None
See application file for complete search history.

(56) References Cited

U.S. PATENT DOCUMENTS

| | | |
|---|---|---|
| 8,018,894 B2 | 9/2011 | Roy et al. |
| 8,265,041 B2 | 9/2012 | Mason et al. |
| 8,644,772 B2 * | 2/2014 | Cordeiro ........................ 455/73 |

(Continued)

OTHER PUBLICATIONS

IEEE P802.11ad, "IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", IEEE Computer Society, Dec. 28, 2012, pp. 628.

(Continued)

*Primary Examiner* — Donald Mills
(74) *Attorney, Agent, or Firm* — Arent Fox LLP

(57) ABSTRACT

One innovation includes an apparatus, for wirelessly communicating with a communication system via a first wireless channel and a second wireless channel, including a memory unit that is configured to store a first data packet and a second data packet, the first data packet and the second data packet have consecutive sequence numbers. The apparatus further includes a processor configured to retrieve the first data packet and the second data packet from the memory unit, a transceiver that is configured to transmit the first data packet to the communication system via the first channel, to receive a first acknowledgement from the communication system and to transmit the second data packet to the communication system via the second channel after the processor detects that the first acknowledgement comprises a positive acknowledgement of the first reception information.

23 Claims, 16 Drawing Sheets

(56) References Cited

U.S. PATENT DOCUMENTS

| | | | |
|---|---|---|---|
| 8,743,809 B2* | 6/2014 | Vashi | H04W 72/02 370/329 |
| 8,849,289 B2* | 9/2014 | Kwon et al. | 455/450 |
| 2006/0104300 A1 | 5/2006 | Ho | |
| 2008/0320354 A1 | 12/2008 | Doppler et al. | |
| 2009/0323531 A1* | 12/2009 | Matta | 370/235 |
| 2011/0013089 A1 | 1/2011 | Adolphson et al. | |
| 2011/0228783 A1 | 9/2011 | Flynn et al. | |
| 2011/0261735 A1 | 10/2011 | Cordeiro | |
| 2013/0005268 A1 | 1/2013 | Zhang et al. | |
| 2013/0028247 A1 | 1/2013 | Li | |

OTHER PUBLICATIONS

International Search Report and Written Opinion—PCT/US2014/020427—ISA/EPO—Jul. 7, 2014.

Maltz D.A., et al., "MSOCKS: an architecture for transport layer mobility", INFOCOM '98, Seventeenth Annual Joint Conference of the IEEE Computer and Communications Societies, Proceedings, IEEE San Francisco, CA, USA Mar. 29-Apr. 2, 1998, New York, NY, USA, IEEE, US, vol. 3, Mar. 29, 1998, pp. 1037-1045, XP010270326, DOI: 10.1109/INFOCOM.1998.662913 ISBN: 978-0-7803-4383-2 figure 1 paragraphs [0II.], [III.B.1], [III.B.2].

Partial International Search Report—PCT/US2014/020427—ISA/EPO—Jun. 3, 2014.

Yuan D., et al., "HOPSCOTCH: An adaptive and distributed channel hopping technique for interference avoidance in wireless sensor networks," 37th Annual IEEE Conference on Local Computer Networks (LCN), Oct. 22, 2012, pp. 635-642, XP032321514, DOI: 10.1109/LCN.2012.6423685, ISBN: 978-1-4673-1565-4, paragraphs [00I.], [III.A.III.B], [0IV.], figures 1,7-9.

* cited by examiner

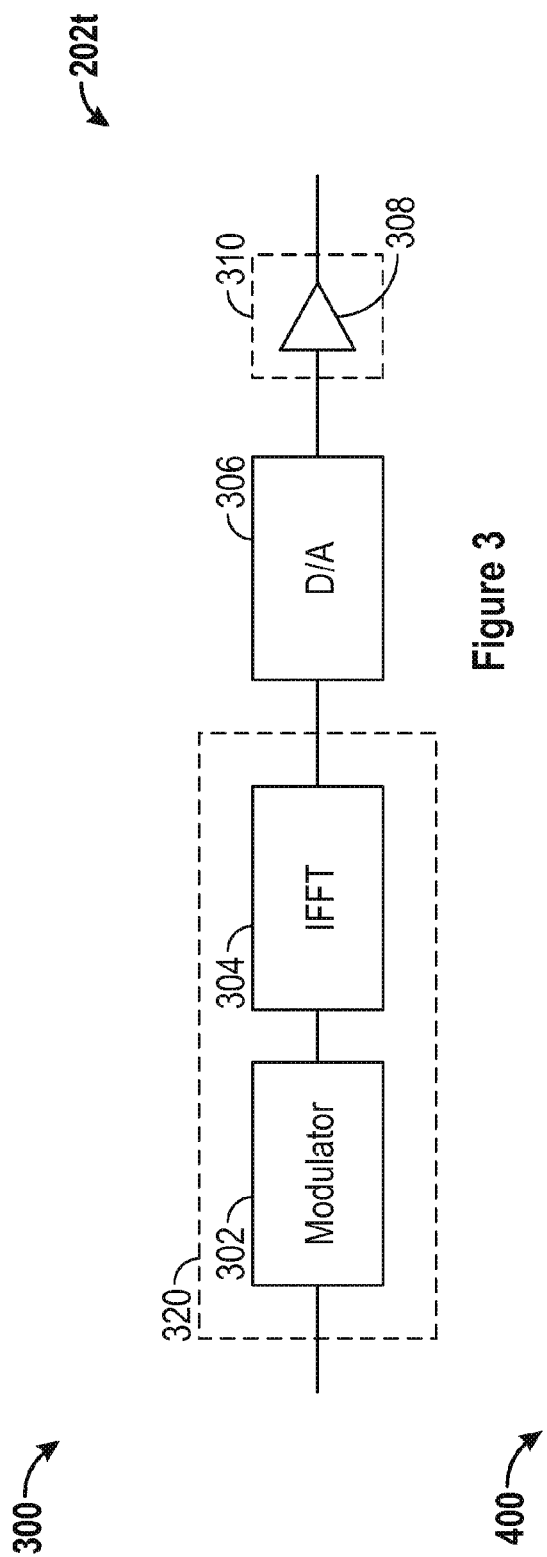
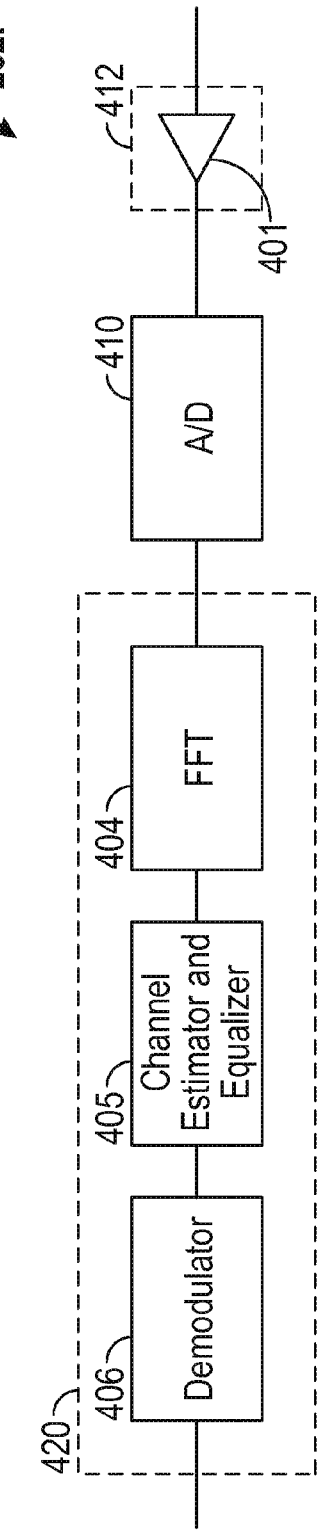
Figure 3
Figure 4

SYSTEMS AND METHODS FOR SEAMLESS DATA STREAM TRANSFER DURING BAND SWITCH BETWEEN WIRELESS STATIONS

BACKGROUND

1. Field

The present application relates generally to wireless communications, and more specifically to systems, methods, and devices having wireless dual concurrent bands (DCB) or multiple concurrent bands (MCB), including operations achieving higher overall throughput and improving communication efficiency via band and/or channel switching and buffer management.

2. Background

In many telecommunication systems, communications networks are used to exchange messages among several interacting spatially-separated devices. Networks may be classified according to geographic scope, which could be, for example, a metropolitan area, a local area, or a personal area. Such networks may be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used, e.g., Internet protocol suite, Synchronous Optical Networking (SONET), Ethernet, etc.

Wireless networks are often preferred when the network elements are mobiles and thus have dynamic connectivity needs, or if the network architecture is formed in an ad hoc, rather than fixed, topology. Wireless networks may employ intangible physical media in an unguided propagation mode using electromagnetic waves in the radio, microwave, infrared, optical, etc. frequency bands. Wireless networks advantageously facilitate user mobility and rapid field deployment when compared to fixed wired networks.

The devices in a wireless network may transmit/receive information between each other. The information may include packets, which in some aspects may be referred to as data units. The packets may include overhead information (e.g., header information, packet properties, etc.) that helps in routing the packet through the network, identifying the data in the packet, processing the packet, etc., as well as data, for example user data, multimedia content, etc. as might be carried in a payload of the packet.

Recent evolutions of IEEE 802.11 standard expand Wi-Fi onto multiple frequency bands. These bands include: 2 GHz frequency band for IEEE 802.11b/g/n, 5 GHz frequency band for IEEE 802.11a/n/ac, 60 GHz frequency band for IEEE 802.11ad, 900 MHz frequency band for IEEE 802.11ah and TVWS band for IEEE 802.11af. Recent technology enables a wireless device to concurrently operate on multiple bands. With a MCB station (STA) and a MCB access point (AP), multiple links may be established between the STA and the AP. Many Wi-Fi products support DCB, usually including the 2 GHz frequency band and 5 GHz frequency band. A DCB STA and a DCB AP may operate on both frequency bands concurrently and achieve higher overall throughput. However, such a DCB operation mode may cause higher power consumption, and therefore may not be beneficial. Therefore, it would be desirable if a DCB STA or a MCB STA can switch an operation frequency band with an associated AP dynamically.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include providing wireless communication in sub-gigahertz bands for low power and long distance wireless communications.

One aspect of the disclosure provides an apparatus for wirelessly communicating with a communication system via a first wireless channel and a second wireless channel. The apparatus includes a memory unit that is configured to store a first data packet and a second data packet. The first data packet and the second data packet have consecutive sequence numbers. The apparatus further includes a processor that is operationally coupled to the memory unit and is configured to retrieve the first data packet and the second data packet from the memory unit. The apparatus further includes a transceiver that is operationally coupled to the processor and is configured to transmit the first data packet to the communication system via at least a first one of the first channel or the second channel. The apparatus is configured to transmit the first data packet to the communication system via the first channel, to receive via the first channel a first acknowledgement including reception information associated with the first data packet from the communication system, and to transmit the second data packet to the communication system via the second channel after the apparatus determines that the first acknowledgement includes reception information that indicates successful reception of the first data packet.

Another aspect of the disclosure provides a method of wirelessly communicating with a communication system via a first wireless channel and a second wireless channel. The method includes transmitting a first data packet to the communication system via the first channel. The method further includes receiving a first acknowledgement from the communication system via the first channel. The first acknowledgement comprises first reception information that indicates successful reception of the first data packet. The method further includes transmitting the second data packet to the communication system via the second channel when the first acknowledgement includes a successful acknowledgement of the first reception information.

Yet another aspect of the disclosure provides an apparatus for wirelessly communicating with a communication system via a first wireless channel and a second wireless channel. The apparatus includes means for transmitting a first data packet to the communication system via the first channel. The apparatus further includes means for receiving a first acknowledgement from the communication system via the first channel. The first acknowledgement comprises reception information that indicates successful reception of the first data packet. The apparatus further includes means for transmitting the second data packet to the communication system via the second channel when the first acknowledgement includes a successful acknowledgement of the first reception information.

One aspect of the disclosure provides an apparatus for wirelessly communicating with a communication system via a first wireless channel and a second wireless channel. The apparatus is configured to receive a first data packet from the communication system via the first channel, to transmit via the first channel a first acknowledgement including reception information associated with the first data packet from the communication system, and to receive a second packet from the communication system via the second channel. The first packet and the second packet have consecutive sequence numbers.

Another aspect of the disclosure provides a method of wirelessly communicating with a communication system via a first wireless channel and a second wireless channel. The method includes receiving a first data packet from the communication system via the first channel. The method further includes transmitting a first acknowledgement to the communication system via the first channel. The first acknowledgement comprises first reception information associated with the first data packet. The method further includes receiving a second packet from the communication system via the second channel. The first packet and the second packet have consecutive sequence numbers.

Yet another aspect of the disclosure provides an apparatus for wirelessly communicating with a communication system via a first wireless channel and a second wireless channel. The apparatus includes means for means for receiving a first data packet from the communication system via the first channel. The apparatus further includes means for transmitting a first acknowledgement to the communication system via the first channel. The first acknowledgement comprises first reception information associated with the first data packet. The apparatus further includes means for receiving a second packet from the communication system via the second channel. The first packet and the second packet have consecutive sequence numbers.

One aspect of the disclosure provides an apparatus for wirelessly communicating with a communication system via a first channel and a second channel. The apparatus includes a first buffer configured to store data packets from the first channel and a second buffer configured to store data packets from the second channel. The apparatus further includes a memory unit configured to store information comprising: a first start sequence number of the first buffer, a first window size of the first buffer, a second start sequence number of the second buffer, and a second window size of the second buffer. The apparatus further includes a processor operationally coupled to the first buffer, the second buffer and the memory unit, the processor configured to: copy the first start sequence number to the second start sequence number, and copy the first window size to the second window size.

Another aspect of the disclosure provides a method of wirelessly communicating with a communication system via a first channel and a second channel. The method includes copying a first start sequence number of a first buffer to a second start sequence number of a second buffer. The method further includes copying a first window size of the first buffer to a second window size of the second buffer. The first buffer is configured to store data packets from the first channel. The second buffer is configured to store data packets from the second channel.

Yet another aspect of the disclosure provides an apparatus for wirelessly communicating with a communication system via a first channel and a second channel. The apparatus includes means for copying a first start sequence number of a first buffer to a second start sequence number of a second buffer. The apparatus further includes means for copying a first window size of the first buffer to a second window size of the second buffer. The first buffer is configured to store data packets from the first channel. The second buffer is configured to store data packets from the second channel.

BRIEF DESCRIPTION OF THE DRAWINGS

FIG. 3 shows a functional block diagram of exemplary components that may be utilized in the wireless device of FIG. 2 to transmit wireless communications.

FIG. 4 shows a functional block diagram of exemplary components that may be utilized in the wireless device of FIG. 2 to receive wireless communications.

DETAILED DESCRIPTION

Figure 1:
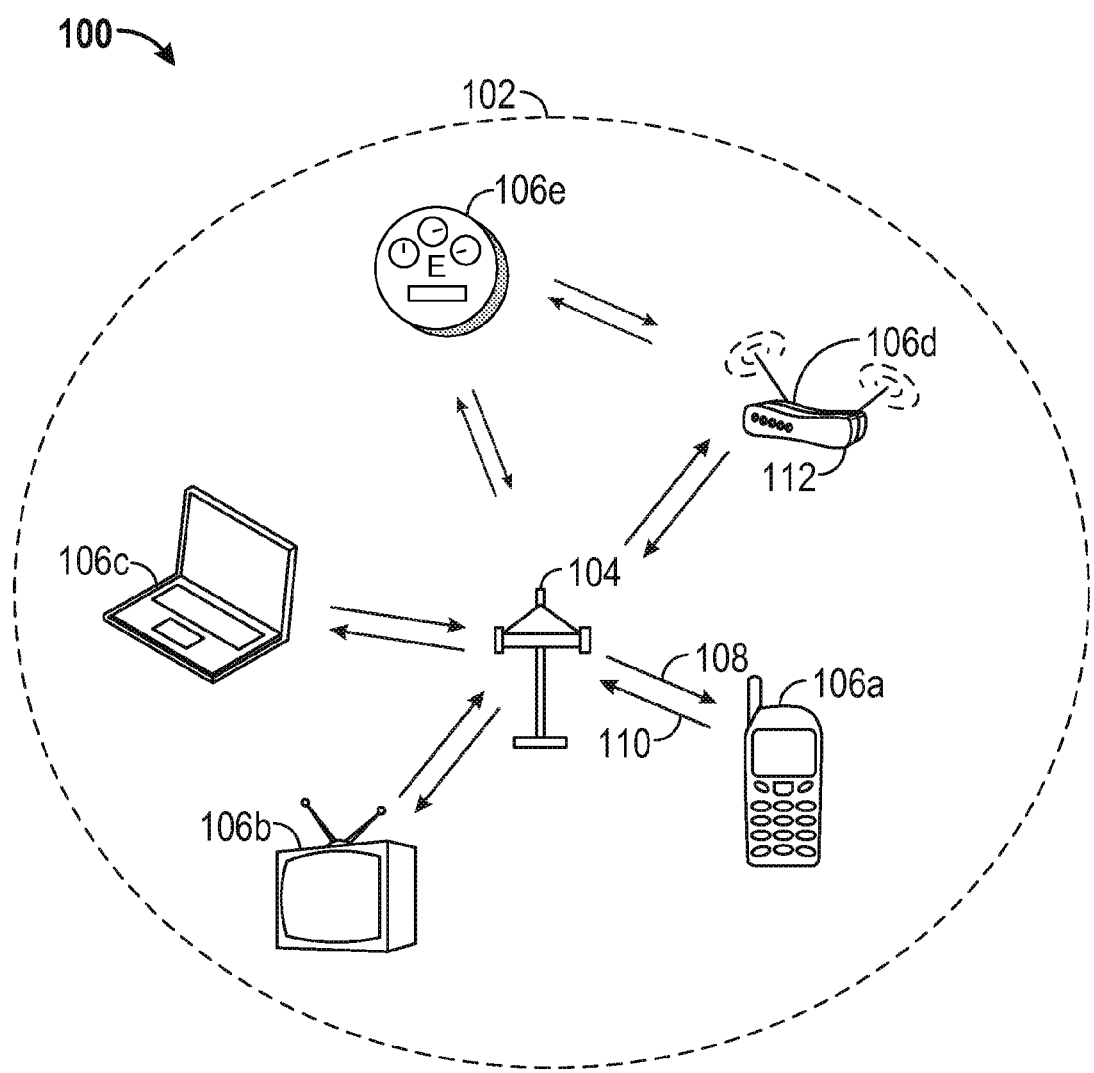
FIG. 1 illustrates an exemplary wireless communication system in which aspects of the present disclosure may be employed according to at least one illustrative implementation.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Recent evolutions of IEEE 802.11 standard and technologies expand Wi-Fi onto multiple frequency bands and enable a wireless device to concurrently operate on multiple bands. A multiple concurrent band STA and a multiple concurrent band AP may operate on both frequency bands concurrently and achieve higher overall throughput. However, such a multiple concurrent bands operation mode may cause higher power consumption, and therefore may not always be beneficial. Therefore, it would be desirable if the multiple concurrent bands STA can switch an operation frequency band with an associated AP dynamically. The present application relates generally to systems, methods and devices improving wireless communications, and more specifically to systems, methods, and devices having wireless dual concurrent bands (DCB) or multiple concurrent bands (MCB), including operations achieving higher overall throughput and improving communication efficiency via band and/or channel switching and buffer management.

Wireless network technologies may include various types of wireless local area networks (WLANs). A WLAN may be used to interconnect nearby devices together, employing widely used networking protocols. The various aspects described herein may apply to any communication standard, such as Wi-Fi or, more generally, any member of the IEEE 802.11 family of wireless protocols. For example, the various aspects described herein may interoperate with or be used as part of the IEEE 802.11ah protocol, which may use sub-1 GHz bands. However, it should be appreciated that a wide variety of other bands and wireless protocols are contemplated by the embodiments described herein.

In some aspects, wireless signals in a sub-gigahertz band may be transmitted according to the 802.11 protocol using orthogonal frequency-division multiplexing (OFDM), direct-sequence spread spectrum (DSSS) communications, a combination of OFDM and DSSS communications, or other schemes. Implementations described herein may be used for sensors, metering, and smart grid networks. Advantageously, aspects of certain embodiments may include wireless devices that may consume less power than devices implementing other wireless protocols, and/or may be used to transmit wireless signals across a relatively long range, for example about one kilometer or longer. These devices may be configured to operate on power provided by energy storage devices and may be configured to operate without replacing the energy storage device for long periods of time (e.g., months or years).

Certain of the devices described herein may further implement Multiple Input Multiple Output (MIMO) technology. A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels or streams, where $N_S \leq \min \{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and an STA serves as a user of the WLAN. For example, a STA may be a laptop computer, a personal digital assistant (PDA), a mobile phone, etc. In an example, an STA connects to an AP via a Wi-Fi (e.g., IEEE 802.11 protocol) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

Devices described herein, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g., for use with hotspots), or to implement machine-to-machine communications.

FIG. 1 illustrates an example of a wireless communication system 100 in which aspects of the present disclosure may be employed. The wireless communication system 100 may operate pursuant to a wireless standard, for example an 802.11 standard. The wireless communication system 100 may include an AP 104, which communicates with STAs 106a, 106b, 106c, 106d, and 106e (collectively STAs 106).

STA 106e may have difficulty communicating with the AP 104 or may be out of range and unable to communicate with the AP 104. As such, another STA 106d may be configured as a relay 112 that relays communications between the STA 106e and the AP 104.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

Figure 2:
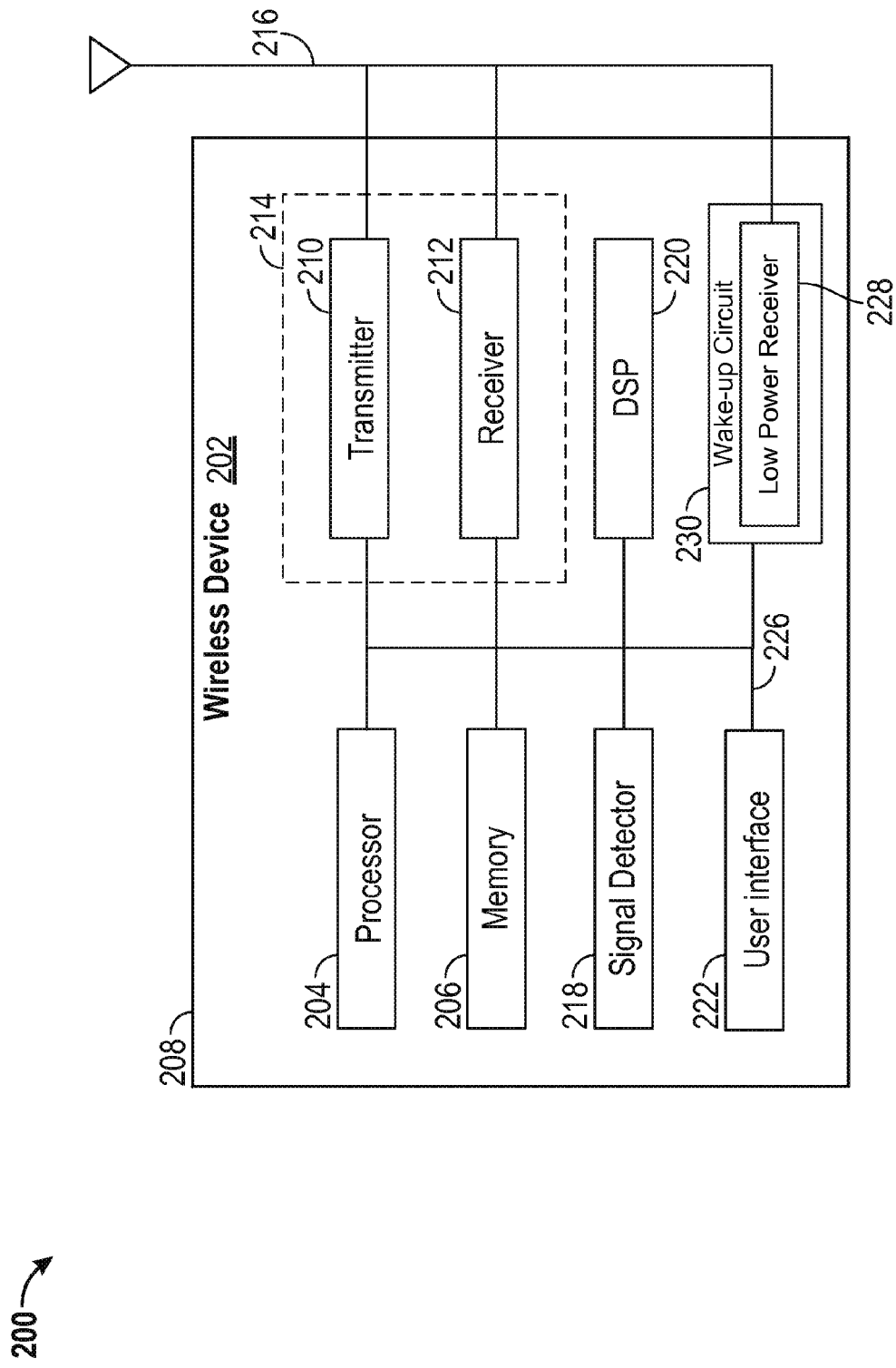
FIG. 2 shows a functional block diagram of an exemplary wireless device that may be employed within the wireless communication system of FIG. 1 according to at least one illustrative implementation.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104, or one of the STAs 106 of FIG. 1.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

When the wireless device 202 is implemented or used as a transmitting node, the processor 204 may be configured to select one of a plurality of media access control (MAC) header types, and to generate a packet having that MAC header type. For example, the processor 204 may be configured to generate a packet comprising a MAC header and a payload and to determine what type of MAC header to use, as discussed in further detail below.

When the wireless device 202 is implemented or used as a receiving node, the processor 204 may be configured to process packets of a plurality of different MAC header types. For example, the processor 204 may be configured to determine the type of MAC header used in a packet and process the packet and/or fields of the MAC header accordingly as further discussed below.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The transmitter 210 may be configured to wirelessly transmit packets having different MAC header types. For example, the transmitter 210 may be configured to transmit packets with different types of headers generated by the processor 204, discussed above.

The receiver 212 may be configured to wirelessly receive packets having different MAC header type. In some aspects, the receiver 212 is configured to detect a type of a MAC header used and process the packet accordingly, as discussed in further detail below.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a data unit for transmission. In some aspects, the data unit may comprise a physical layer data unit (PPDU). In some aspects, the PPDU is referred to as a packet.

The wireless device 202 may further comprise a wake-up circuit 230 comprising a second, low power receiver 228. In one aspect, the low power receiver 228 may be configured to consume power that is lower than power normally consumed by the receiver 214 during operation. For example, the low power receiver 228 may be configured to consume on the order of 10×, 20×, 50× or 100× (or more) less power when operating as compared to the transceiver 214. In one aspect, the low power receiver 228 may be configured to receive signals using modulation/demodulation techniques such as on-off keying or frequency-shift keying (FSK) as compared to the transceiver 214 that may be configured to transmit and receive signals based on OFDM and other comparable techniques. A STA 106 that is a wireless device 202 having the low power receiver 228 may be referred to herein as a low power receiver STA 106e. Other STAs that may not include the low power receiver 228 or may be operating in a mode where the transceiver 214 is activated may be referred to herein as a STA 106.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements. Furthermore, the processor 204 may be used to implement any of the components, modules, circuits, or the like described below, or each may be implemented using a plurality of separate elements.

For ease of reference, when the wireless device 202 is configured as a transmitting node, it is hereinafter referred to as a wireless device 202t. Similarly, when the wireless device 202 is configured as a receiving node, it is hereinafter referred to as a wireless device 202r. A device in the wireless communication system 100 may implement only functionality of a transmitting node, only functionality of a receiving node, or functionality of both a transmitting node and a receive node.

As discussed above, the wireless device 202 may comprise an AP 104, a STA 106, or a low power receiver STA 106e. FIG. 3 illustrates various components that may be utilized in the wireless device 202t to transmit wireless communications. The components illustrated in FIG. 3 may be used, for example, to transmit OFDM communications.

The wireless device 202t of FIG. 3 may comprise a modulator 302 configured to modulate bits for transmission. For example, the modulator 302 may determine a plurality of symbols from bits received from the processor 204 (FIG. 2) or the user interface 222 (FIG. 2), for example by mapping bits to a plurality of symbols according to a constellation. The bits may correspond to user data or to control information. In some aspects, the bits are received in codewords. In one aspect, the modulator 302 comprises a QAM (quadrature amplitude modulation) modulator, for example a 16-QAM modulator or a 64-QAM modulator. In other aspects, the modulator 302 comprises a binary phase-shift keying (BPSK) modulator or a quadrature phase-shift keying (QPSK) modulator.

The wireless device 202t may further comprise a transform module 304 configured to convert symbols or otherwise modulated bits from the modulator 302 into a time domain. In FIG. 3, the transform module 304 is illustrated as being implemented by an inverse fast Fourier transform (IFFT) module. In some implementations, there may be multiple transform modules (not shown) that transform units of data of different sizes. In some implementations, the transform module 304 may be itself configured to transform units of data of different sizes. For example, the transform module 304 may be configured with a plurality of modes, and may use a different number of points to convert the symbols in each mode. For example, the IFFT may have a mode where 32 points are used to convert symbols being transmitted over 32 tones (i.e., subcarriers) into a time domain, and a mode where 64 points are used to convert symbols being transmitted over 64 tones into a time domain. The number of points used by the transform module 304 may be referred to as the size of the transform module 304. It should be appreciated that the transform module 304 may be configured to operate according to additional modes where 128 points, 256 points, 512 points, and 1024 points are used, and the like.

In FIG. 3, the modulator 302 and the transform module 304 are illustrated as being implemented in the DSP 320. In some aspects, however, one or both of the modulator 302 and the transform module 304 are implemented in the processor 204 or in another element of the wireless device 202t (e.g., see description above with reference to FIG. 2).

As discussed above, the DSP 320 may be configured to generate a data unit for transmission. In some aspects, the modulator 302 and the transform module 304 may be configured to generate a data unit comprising a plurality of fields including control information and a plurality of data symbols.

Returning to the description of FIG. 3, the wireless device 202t may further comprise a digital to analog converter 306 configured to convert the output of the transform module into an analog signal. For example, the time-domain output of the transform module 306 may be converted to a baseband OFDM signal by the digital to analog converter 306. The digital to analog converter 306 may be implemented in the processor 204 or in another element of the wireless device 202 of FIG. 2. In some aspects, the digital to analog converter 306 is implemented in the transceiver 214 (FIG. 2) or in a data transmit processor.

The analog signal may be wirelessly transmitted by the transmitter 310. The analog signal may be further processed before being transmitted by the transmitter 310, for example by being filtered or by being upconverted to an intermediate or carrier frequency. In the aspect illustrated in FIG. 3, the transmitter 310 includes a transmit amplifier 308. Prior to being transmitted, the analog signal may be amplified by the transmit amplifier 308. In some aspects, the amplifier 308 comprises a low noise amplifier (LNA).

The transmitter 310 is configured to transmit one or more packets or data units in a wireless signal based on the analog signal. The data units may be generated using the processor 204 (FIG. 2) and/or the DSP 320, for example using the modulator 302 and the transform module 304 as discussed above. Data units that may be generated and transmitted as discussed above are described in additional detail below.

FIG. 4 illustrates various components that may be utilized in the wireless device 202 of FIG. 2 to receive wireless communications. The components illustrated in FIG. 4 may be used, for example, to receive OFDM communications. In some aspects, the components illustrated in FIG. 4 are used to receive data units over a bandwidth of equal to or less than 1 MHz. For example, the components illustrated in FIG. 4 may be used to receive data units transmitted by the components discussed above with respect to FIG. 3.

The receiver 412 of wireless device 202r is configured to receive one or more packets or data units in a wireless signal. Data units that may be received and decoded or otherwise processed as discussed below.

In the aspect illustrated in FIG. 4, the receiver 412 includes a receive amplifier 401. The receive amplifier 401 may be configured to amplify the wireless signal received by the receiver 412. In some aspects, the receiver 412 is configured to adjust the gain of the receive amplifier 401 using an automatic gain control (AGC) procedure. In some aspects, the automatic gain control uses information in one or more received training fields, such as a received short training field (STF) for example, to adjust the gain. Those having ordinary skill in the art will understand methods for performing AGC. In some aspects, the amplifier 401 comprises an LNA.

The wireless device 202r may comprise an analog to digital converter 410 configured to convert the amplified wireless signal from the receiver 412 into a digital representation thereof. Further to being amplified, the wireless signal may be processed before being converted by the digital to analog converter 410, for example by being filtered or by being downconverted to an intermediate or baseband frequency. The analog to digital converter 410 may be implemented in the processor 204 (FIG. 2) or in another element of the wireless device 202r. In some aspects, the analog to digital converter 410 is implemented in the transceiver 214 (FIG. 2) or in a data receive processor.

The wireless device 202r may further comprise a transform module 404 configured to convert the representation of the wireless signal into a frequency spectrum. In FIG. 4, the transform module 404 is illustrated as being implemented by a fast Fourier transform (FFT) module. In some aspects, the transform module may identify a symbol for each point that it uses. As described above with reference to FIG. 3, the transform module 404 may be configured with a plurality of modes, and may use a different number of points to convert the signal in each mode. For example, the transform module 404 may have a mode where 32 points are used to convert a signal received over 32 tones into a frequency spectrum, and a mode where 64 points are used to convert a signal received over 64 tones into a frequency spectrum. The number of points used by the transform module 404 may be referred to as the size of the transform module 404. In some aspects, the transform module 404 may identify a symbol for each point that it uses. It should be appreciated that the transform module 404 may be configured to operate according to additional modes where 128 points, 256 points, 512 points, and 1024 points are used, and the like.

The wireless device 202r may further comprise a channel estimator and equalizer 405 configured to form an estimate of the channel over which the data unit is received, and to remove certain effects of the channel based on the channel estimate. For example, the channel estimator 405 may be configured to approximate a function of the channel, and the channel equalizer may be configured to apply an inverse of that function to the data in the frequency spectrum.

The wireless device 202r may further comprise a demodulator 406 configured to demodulate the equalized data. For example, the demodulator 406 may determine a plurality of bits from symbols output by the transform module 404 and the channel estimator and equalizer 405, for example by reversing a mapping of bits to a symbol in a constellation. The bits may be processed or evaluated by the processor 204 (FIG. 2), or used to display or otherwise output information to the user interface 222 (FIG. 2). In this way, data and/or information may be decoded. In some aspects, the bits correspond to codewords. In one aspect, the demodulator 406 comprises a QAM (quadrature amplitude modulation) demodulator, for example a 16-QAM demodulator or a 64-QAM demodulator. In other aspects, the demodulator 406 comprises a binary phase-shift keying (BPSK) demodulator or a quadrature phase-shift keying (QPSK) demodulator.

In FIG. 4, the transform module 404, the channel estimator and equalizer 405 and the demodulator 406 are illustrated as being implemented in the DSP 420. In some aspects, however, one or more of the transform module 404, the channel estimator and equalizer 405, and the demodulator 406 are implemented in the processor 204 (FIG. 2) or in another element of the wireless device 202 (FIG. 2).

As discussed above, the wireless signal received at the receiver 212 comprises one or more data units. Using the functions or components described above, the data units or data symbols therein may be decoded evaluated or otherwise evaluated or processed. For example, the processor 204 (FIG. 2) and/or the DSP 420 may be used to decode data symbols in the data units using the transform module 404, the channel estimator and equalizer 405, and the demodulator 406.

Data units exchanged by the AP 104 and the STA 106 may include control information or data, as discussed above. At the physical (PHY) layer, these data units may be referred to as physical layer protocol data units (PPDUs). In some aspects, a PPDU may be referred to as a packet or physical layer packet. Each PPDU may comprise a preamble and a payload. The preamble may include training fields and a SIG field. The payload may comprise a Media Access Control (MAC) header or data for other layers, and/or user data, for example. The payload may be transmitted using one or more data symbols. The systems, methods, and devices herein may utilize data units with training fields whose peak-to-power ratio has been minimized.

The wireless device 202t shown in FIG. 3 shows an example of a single transmit chain to be transmitted over an antenna. The wireless device 202r shown in FIG. 4 shows an example of a single receive chain to be received over an antenna. In some implementations, the wireless device 202t or 202r may implement a portion of a MIMO system using multiple antennas to simultaneously transmit data.

Accordingly, certain implementations are directed to sending wireless signals using a variety of different bandwidths in different frequency ranges. For example, in one exemplary implementation, a symbol may be configured to be transmitted or received using a bandwidth of 1 MHz. The wireless device 202 of FIG. 2 may be configured to operate in one of several modes. In one mode, symbols such as OFDM symbols may be transmitted or received using a bandwidth of 1 MHz. In another mode, symbols may be transmitted or received using a bandwidth of 2 MHz. Additional modes may also be provided for transmitting or receiving symbols using a bandwidth of 4 MHz, 8 MHz, 16 MHz, and the like. The bandwidth may also be referred to as the channel width. In addition, additional modes or configuration are possible such as for example of using bandwidths of 20 MHz, 40 MHz, 80 MHz, and the like in the 2.4 GHz band or the 5 GHz. Band.

In a STA 106 (FIG. 1), a significant source of power consumption may be due to the long time spent by the STA 106 in receive mode, either during packet reception and especially during the time a receiver is on and waiting to receive a packet. In battery operated STAs, transmit power may be comparable to receive power, but receive time may be much longer than transmit time. Particularly when operating using a battery, it is desirable to reduce the awake time of STAs to reduce power consumption. An awake time, an awake period, an awake mode or an active mode is an operation of a STA such that the STA is actively receiving and/or transmitting a wireless signal. One way to reduce the awake time of a STA 106 is to turn off the STA receiver 212 (FIG. 2) for a majority of a time interval except for certain short intervals of time. In this case the transmitter 210 (FIG. 2) and receiver 212 may agree on the on/off cycle. In some cases, this may not be flexible or efficient. For example, in typical applications, the traffic pattern may not be predictable. In addition, the agreed awake time may not match the traffic pattern so some awake times may be useless. In addition, the traffic may come at times where STA 106 is off and there may be no way to deliver the packet until the STA 106 wakes up.

In an embodiment, a low power receiver 228 (FIG. 2) as described herein may be provided in a low power receiver STA 106e. In one aspect, the low power receiver STA 106e may communicate with an AP 104. In this case, there may be an association (e.g., registration) procedure where certain information is exchanged between the low power receiver STA 106e and the AP 104 to determine future communication parameters and activities. In another aspect, the low power receiver STA 106e may communicate between other STAs that are not associated with each other.

In one aspect, the low power receiver 228 may remain on substantially indefinitely while the low power receiver STA 106e is in operation. In another aspect, the low power "wake up" receiver 228 may be operate according to an on/off duty cycle as defined by a given schedule, to further reduce energy consumption. For example, the processor 204 or a controller (not shown) may regulate the schedule. Furthermore, the processor 204 may be configured to otherwise control when the low power receiver 228 listens for the wake-up signal for different durations and time periods (e.g., awake periods for example during business hours as compared to other sleep periods. A sleep period or a sleep mode is an operation of a wireless device, in which the wireless device is not actively receiving or transmitting a wireless signal for consuming much less power or even zero power.).

According to an embodiment, to maximize sleep, the transceiver 214, analog and digital, may be configured to be off (e.g., powered down). The only circuit that is powered is the RF wake-up circuit 230. The low power receiver 228 of the RF wake-up circuit 230 may listen for a particular RF signal structure. When detected, the RF wake-up circuit 230 turns on or otherwise activates the transceiver 214, analog and digital. In some cases, the transceiver 214 and modem may take ~100-200 μs to wake-up (assuming transceiver 214 stays powered). The wake up time may be a function of PLL convergence time, loading of calibration coefficients, and other register loading. In some cases, wake-up time may be as large as ~2 ms if transceiver 214 is fully powered off as well. Thus, in one aspect, the wake-up packet may reserve a wireless medium for a time period for the transceiver 214 to wake-up and start receiving data and include the special RF signal structure.

In some embodiments, a low power receiver STA 106e may not be associated with other STAs. For examples the STA 106e and other STAs may not be associated with an AP and their interaction with each other is based on events and temporary proximity (e.g., asynchronous operation). For example, in a building, a battery operated small sensor is placed in each room. Each sensor may be configured as a low power receiver STA 106e. As described above, the transceiver 214 of the STA 106e is normally off, to save power. A smartphone, configured as a STA 106, comes in to the building and wants to interact with the sensor STA 106e, e.g., to discover its location or issue a command. The smartphone STA 106 issues a low power wake up signal. A neighboring sensor STAs 106e may be configured to detect the low power wake-up signal using the wake-up circuit 230 and activate or turn on the transceiver 214 (radio). Either the sensor STA 106e pro-actively sends a packet indicating the location, or the sensor STA 106e waits for reception of a packet from the smartphone STA 106 to determine which action to take.

The wake-up circuit 230 may be configured to operate according to several modes. For example, in a first mode the low power receiver 228 is always on and waiting to receive a wake up packet. This may ensure fastest response but results in higher power consumption. In another mode, the low power wake-up receiver 228 is not always on and may operate according to a wake-up duty cycle. The wake up duty cycle may be adapted to tolerable interaction delay. In some cases, the wake up signal may therefore be sent multiple times to find the receiver in the ON state.

In other embodiments a low power receiver STA 106e may be associated with an AP 104. As such, in one aspect, the low power receiver STA 106e interaction is with the AP 104 and can exploit cooperation with the AP 104 (e.g., synchronous operation is possible). For example, when associated there may be ways to enhance existing power save modes. For example, in a power save mode, a low power receiver STA 106e may wake up to receive beacons. The beacon indicates if the low power receiver STA 106e needs to stay awake further to receive downlink data (e.g., paged). In addition, there may be enhancement with low power wakeup receiver 228 where the AP 104 sends a low power wake-up signal before the beacon, indicating whether the low power receiver STA 106e is (or may) be paged in the beacon. If the low power receiver STA 106e is for sure not paged, the low power receiver STA 160e need not turn on the transceiver 214 to receive the beacon to save power. In these cases, the low power receiver 228 may need to be on at least some time before the beacon, to receive the wake-up signal.

In addition, by using association there may be benefits based on traffic assumption. For example as there may be a low probability of downlink data (in this case the low power receiver STA 106e may go to sleep most of the times after the low power wake-up signal. In addition, there may be benefits in the case of long sleep time and large clock drift where the low power wake-up signal indicates when a beacon is coming. The low power receiver STA 1063 need not turn on the transceiver 214 until that time.

The RF low power wake-up signal may be transmitted on the same channel as other data signals. For example, the low power wake-up signal may be transmitted on the same channel as Wi-Fi data signals. As such, coexistence with the other data is provided. More particularly, coexistence with Wi-Fi signals may be provided. In one aspect, various considerations may be taken into account for providing coexistence. For example, a wake-up signal may have narrower bandwidth than a Wi-Fi signal. In addition, there may be regulatory limitations on how narrowband the wakeup signal can be which may imply a limit on the sensitivity/range. The low power receiver STAs 106e may be power constrained and likely using low transmit power themselves. As such, for STAs 106e in an associated state (e.g., likely to be close to the AP 104), the downlink link budget may be several dB better than the uplink one. Furthermore, it may be acceptable that the sensitivity of low wake up receiver 228 is up to ~20 dB worse than the regular receiver. For non-associated STAs, for proximity application (e.g. location tags, non-associated scenario) the applications may require less sensitivity, because the range may be less important.

Figure 5:
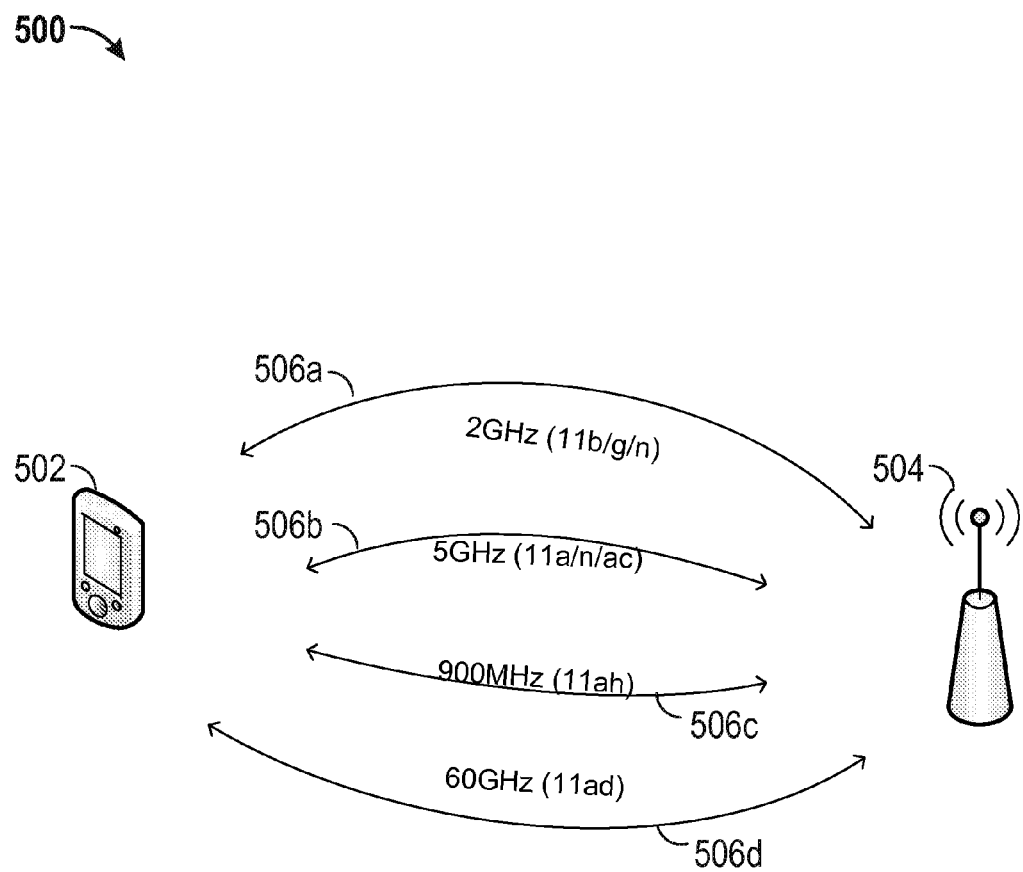
FIG. 5 illustrates an exemplary wireless communication system with multiple concurrent bands.

FIG. 5 shows an exemplary wireless communication system 500 with multiple concurrent frequency bands: frequency bands 506a, 506b, 506c and 506d. The wireless communication system 500 includes at least one STA 502 and an AP 504. The STA 502 is configured to wirelessly communicate with the AP 504 via at least one of the frequency bands 506a-506d. In the implementation illustrated in FIG. 5, the wireless band 506a is a 2 GHz band that may be used for an IEEE 802.11b/g/n communication protocol and/or standard. The wireless band 506b is a 5 GHz band that may be used for an IEEE 802.11a/n/ac communication protocol and/or standard. The wireless band 506c is a 900 MHz band that may be used for an IEEE 802.11 ah communication protocol and/or standard. The wireless band 506d is a 60 GHz band that may be used for an IEEE 802.11 ad communication protocol and/or standard.

In one implementation of the wireless communication system 500, the STA 502 supports the four frequency bands 506a-506d. The STA 502 is configured to be associated with the AP 504 on at least a subset of the four frequency bands 506a-506d. This association between the STA 502 and the AP 504 may be predetermined by a standard and/or an implementation, or based on a user election and/or available user statistic. In another implementation, the STA 502 further operates on at least a subset of the four frequency bands 506a-506d. This operation may also be predetermined by a standard and/or an implementation, or based on a user selection and/or available user static.

In some implementations of the wireless communication system 500, the STA 502 and the AP 504 operate on two or more than concurrent frequency bands. In an exemplary DCB operation, the STA 502 and the AP 504 concurrently operate on two of all the four frequency bands 506a-506d. In an exemplary MCB operation, the STA 502 and the AP 504 concurrently operate on more than two of all the four frequency bands 506a-506d. In an exemplary DCB operation or an exemplary MCB operation, the STA 502 and the AP 504 achieve an overall throughput that is higher than that of a single band operation, in which the STA 502 operates on only one frequency band with the AP 504. In an exemplary DCB operation or an exemplary MCB operation, the STA 502 and the AP 504 consume power more than that of a single band operation.

In some other implementations, the STA 502 dynamically associates with the AP 504 via a single frequency band. For example, the STA 502 may associate with the AP 504 via the frequency band 506c during a first time period. During a second time period, the STA 502 may associate with the AP 504 via the frequency band 506d. Additionally in another implementation of the wireless communication system 500, the STA 502 and the AP 504 dynamically switch an operation band between them. For example, the STA 502 and the AP 504 may operate on the frequency band 506a at the beginning. Later on, the STA 502 and the AP 504 may switch to operate on the frequency band 506b.

There may be many reasons for dynamically switching a frequency band during an association and/or an operation of the wireless communication system 500. One reason is that some operations on some of the frequency bands 506a-506d may provide a throughput higher than some operations on other frequency bands. For example, a 5 GHz frequency band for an IEEE 802.11ac standard and a 60 GHz frequency band for an IEEE 802.111ad standard may support an operation of a data rate over 1 Gbps. A 900 MHz frequency band for an IEEE 802.11ah standard may support an operation of a data rate less than 10 Mbps. Another reason is that some frequency bands may provide a coverage area larger than other frequency bands do. For example, a coverage range of a 2 GHz frequency band may extend to over 100 m. However, a coverage range of a 60 GHz frequency band may be less than 10 m. Yet another reason is that some frequency bands may provide a level of power efficiency higher than other frequency bands do. Another reason is because some frequency bands may be more crowded than other frequency bands during a time period of an operation. For example, on a 2 GHz frequency band, there may be operating a cordless phone, a Bluetooth device, a WiFi device and many other technologies and devices during a time period. However, a 5 GHz frequency band may be less crowded than the 2 GHz frequency band during the same time period.

In some implementations, after a STA receives a certain number of error packets and/or misses a certain number of acknowledgements that the STA expects from a corresponding receiver, the STA will do a band switching and switch from at least one of the current frequency band(s) that the STA is operating on to at least another frequency band. In some other implementations, after a STA measures a signal-to-noise ratio value, a noise level, and/or a received bit error rate (BER) that is less than a certain threshold, the STA will do a band switching and switch from at least one of the current frequency band(s) that the STA is operating on to at least another frequency band. In another implementation, a STA will do a band switching when the STA receives an instruction from a predefined signaling frame.

Figure 6:
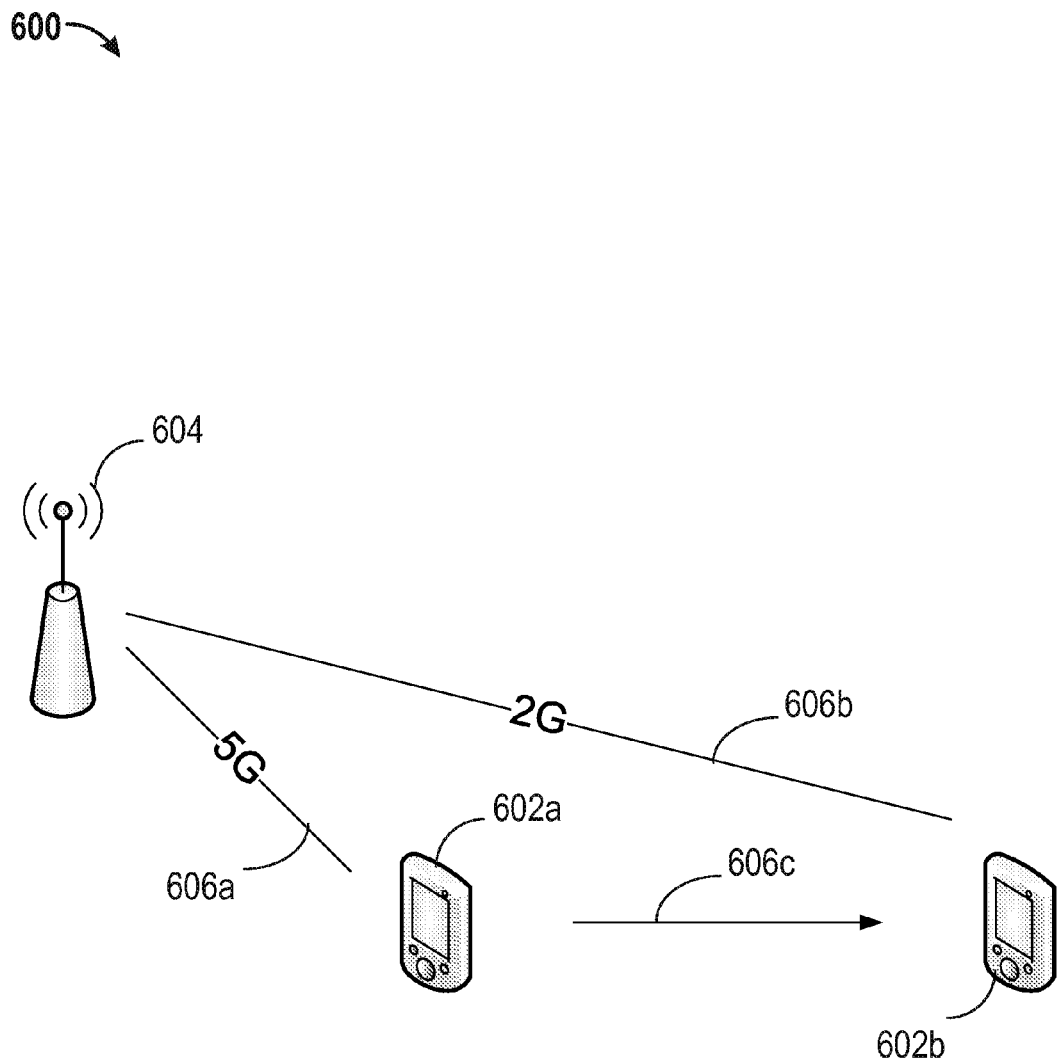
FIG. 6 illustrates another exemplary wireless communication system with dual concurrent bands.

FIG. 6 shows an exemplary wireless communication system 600 with dual concurrent frequency bands: frequency bands 606a and 606b. The frequency band 606a is a 5 GHz frequency band and the frequency band 606b is a 2 GHz frequency band. The wireless communication system 600 includes two STAs 602a and 602b and one AP 604. As show in FIG. 6, the STA 602a communicates with the AP 604 via the frequency band 606a and the STA 602b communicate with the AP 604 via the frequency band 606b. The STA 602a supports both the frequency band 606a and 606b. In addition, a distance between the STA 602a and the AP 604 is shorter than a distance between the STA 602b and the AP 604. As such, the STA 602a may be configured for a high performance operation when the STA 602a is in its current position and the STA 602b may be configured for a good coverage operation when the STA 602b is in its current position.

In one implementation of the wireless communication system 600, when the STA 602a moves from its original position to the current position of the STA 602b, the STA 602a switches from its original 5 GHz operation band to a 2 GHz operation band. During a band switching, it can be desirable that there is minimal interruption on communication connections between the STA 602a and the AP 604, such as web browsing, video streaming, video calls and/or voice calls.

Figure 7A:
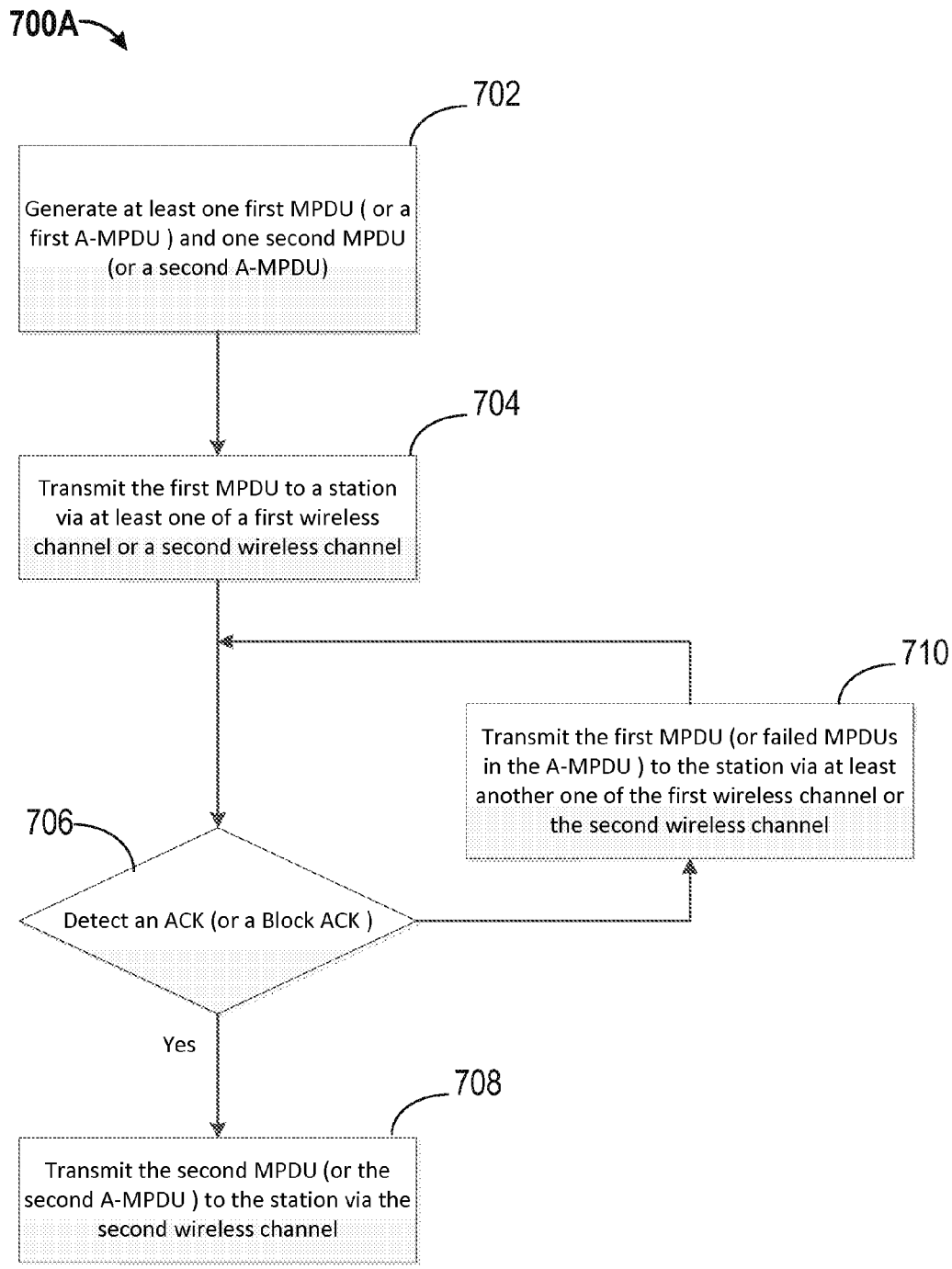
FIG. 7A illustrates a flowchart of an exemplary communication method in accordance with various implementations.
Figure 7B:
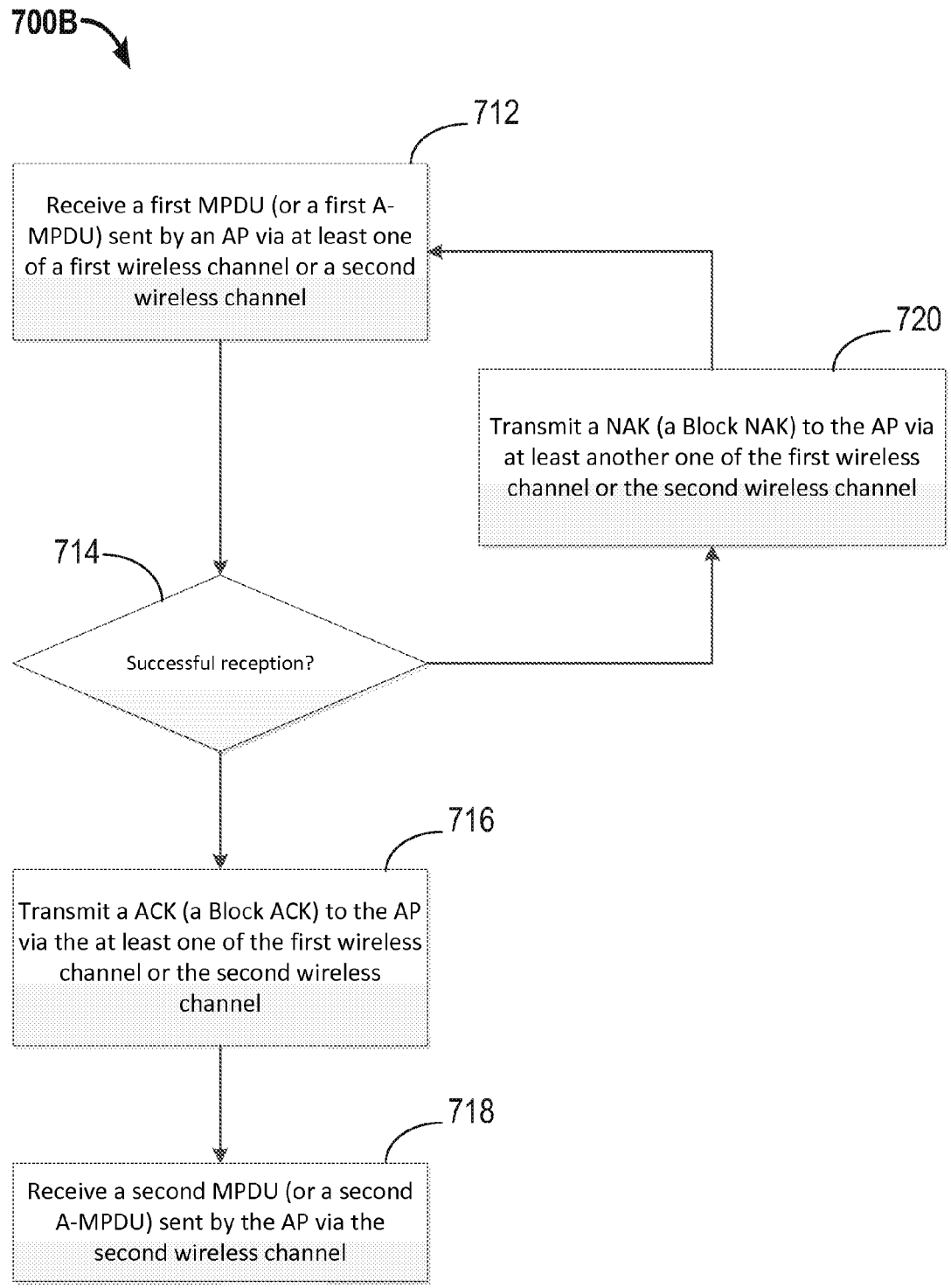
FIG. 7B illustrates another flowchart of an example of a communication method in accordance with various implementations.

FIGS. 7A and 7B show two flowcharts of an exemplary communication method between an AP (e.g., the AP 604 of FIG. 6) and an STA (e.g., any STA 602 of FIG. 6). The method shown in FIG. 7A may be performed by an AP, for example, the AP 604 of FIG. 6. The method shown in FIG. 7B may be performed by a STA, for example, the STA 602a of FIG. 6. The AP 604 is configured to wirelessly communicate with the STA 602a via at least one of the frequency band 606a or the frequency band 606b.

As shown in FIG. 7A, at block 702, the AP 604 is configured to generate at least one first data packet (e.g., a service data unit (SDU), a MAC SDU (MSDU), a MAC protocol data unit (MPDU), or an aggregated MPDU (A-MPDU)) and a second data packet. At block 704, the AP 604 transmits the first data packet via at least one of the frequency band 606a or the frequency band 606b to the STA 602a. In some implementations, the first data packet is sent to the STA 602a via the frequency band 606a. After transmitting the first data packet at block 704, the AP 604 is configured to detect an acknowledgement transmitted from the STA 602a via the least one of the frequency band 606a or the frequency band 606b at block 706. In some implementations, the STA 602a sends the acknowledgement via the frequency band 606a. As such, the AP 604 is configured to detect the acknowledgement via the frequency band 606a. If the AP 604 detects a positive acknowledgement (ACK) from the STA 602a, the AP 604 transmits the second data packet to the station via the frequency band 606b to the STA 602a at block 708. In one implementation, the first data packet and the second data packet have consecutive sequence numbers. Otherwise, the AP 604 retransmits the first data packet to the STA 602a via at least another one of the two frequency bands 606a and 606b at block 710.

FIG. 7B shows a corresponding flowchart of the method performed by the STA 602a. At block 712, the STA 602a is configured to receive the first data packet sent by the AP 604 via the at least one of the frequency band 606a or 606b. In one implementation, the STA is configured to receive the first data packet via the frequency band 606a. At block 714, the STA 602a then demodulates and decodes the first data packet and generates an acknowledgement. If the STA 602a successfully receives the first data packet, the STA 602a transmits an ACK to the AP 604 via the at least one of the frequency band 606a or 606b at block 716. Otherwise, the STA 602a may send a negative acknowledgement (NAK) to the AP 604 via the at least another one of the frequency band 606a or 606b at block 720. In one implementation, the STA 602a is configured to transmit either the ACK or the NAK to the AP 604 via the frequency band 606a. After the STA 602a successfully receives the first data packet from the AP at block 714, the STA 602a receives the second data pack transmitted by the AP 604 via the frequency band 606b. In some implementations, the first data packet and the second data packet have consecutive sequence numbers.

Figure 8:
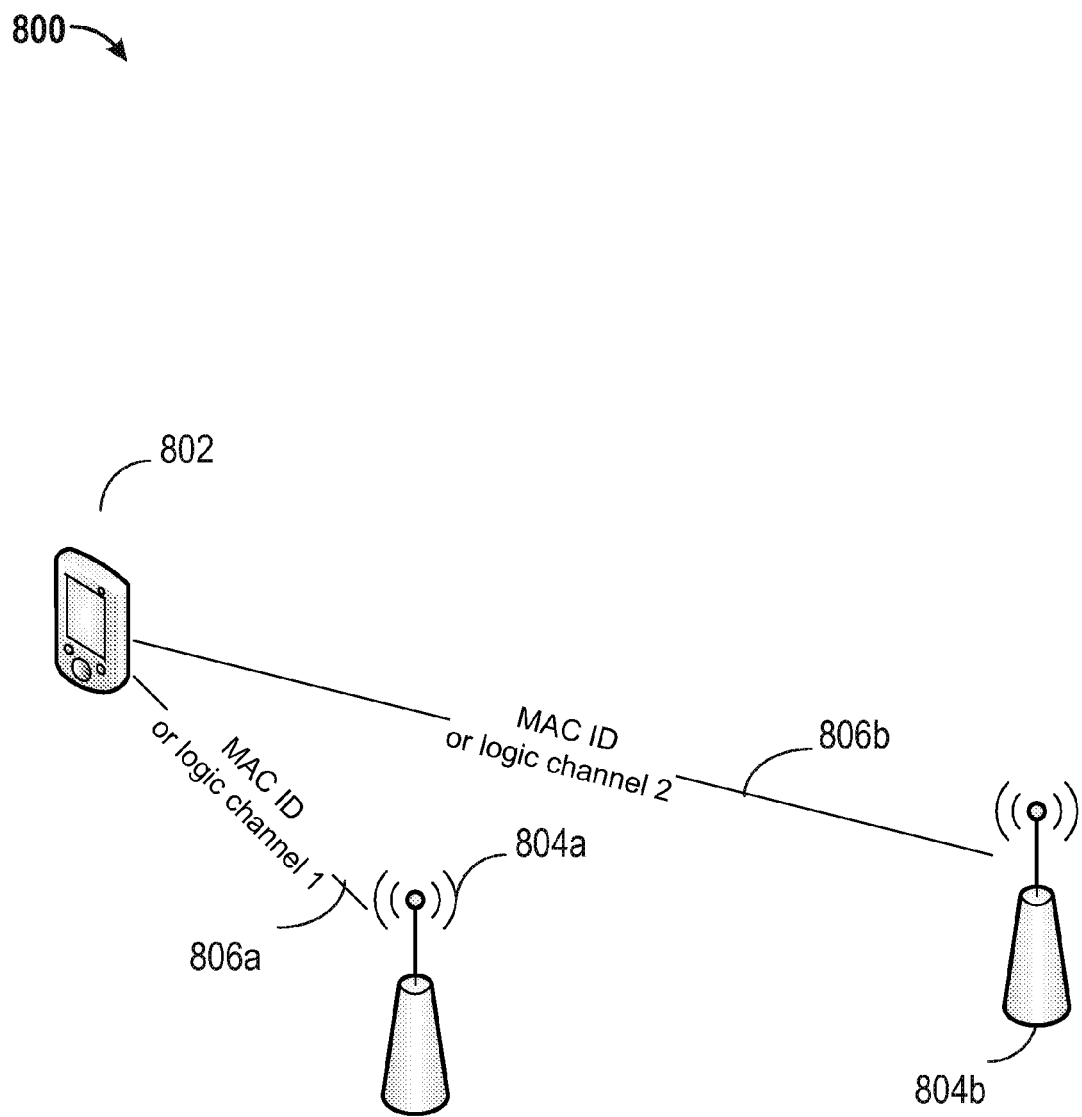
FIG. 8 illustrates an exemplary wireless communication system with two access points.

FIG. 8 shows an exemplary wireless communication system 800 with two APs 804a and 804b and one STA 802. The STA 802 communicates with the AP 804a using a MAC ID or a logic channel 806a of the AP 804a. The STA 802 may also communicate with the AP 804b using a MAC ID or a logic channel 806b of the AP 804b. A logic channel may be uniquely identified by a MAC ID. The logic channels 806a and 806b may operate in a same frequency channel or band. The logic channels 806a and 806b may also operate in two different frequency channels or bands. For any one of the APs 804a and 804b, it may have at least one MAC ID and one MAC ID may be used to identify at least one logic channel.

In one implementation, the STA 802 is configured to communicate with two physical APs 804a and 804b via two frequency bands 806a and 806b, each AP operating on one of the two frequency bands. In this case, the two APs 804a and 804b both are configured to perform band switching with the STA 802 between the two frequency bands.

In another implementation, the STA 802 is configured to use a single MAC address on at least two frequency bands 806a and 806b while the STA 802 communicates with at least one AP. In another implementation, the STA is configured to use two different MAC addresses 806a and 806b on two different frequency bands when the STA communicates with the AP.

In some implementations, the two APs 804a and 804b are two virtual APs and identified by the two different MAC IDs 806a and 806b. These two virtual APs 802a and 804b may be implemented by a single physical AP and these two virtual APs may be taken as two instances of the single physical AP. In another implementation, the STA 802 is configured to wirelessly communicate with the single physical AP via at least two frequency bands, for example, frequency bands 806a and 806b, and to perform band switching between two frequency bands. In this implementation, the two APs 804a and 804b are two instances of the single physical AP on the two different frequency bands 806a and 806b.

When a single physical AP consists of multiple virtual APs, for example, two virtual APs 804a and 804b, each virtual AP operating on a distinct frequency band, for example, the two frequency bands 806a and 806b, the single physical AP may broadcast a beacon frame in all bands with different MAC IDs, for example, different BSSIDs. For example, the single physical AP with 2 GHz, 5 GHz and 900 MHz frequency bands consists of three logical APs, each logical AP for each frequency band, such as: a first virtual AP operates on a 2 GHz frequency band with a first BSSID, a second virtual AP operates on a 5 GHz frequency band with a second BSSID, and a third virtual AP operates on a 900 MHz frequency band with a third BSSID.

Roaming may occur during the STA 802 switching between the two APs 804a and 804b. The two APs 804a and 804b may be two distinct physical APs that may be deployed in a same physical location or in two separate physical locations individually. The two APs 804a and 804b may also be two virtual APs of a single physical AP. In this case, roaming may still happen when the STA 802 switches between the two virtual APs 804a and 804b. In one implementation, the two virtual APs 804a and 804b each correspond to two logical channels 806a and 806b, each operating on two separate frequency bands. For example, the logical channel 806a of the virtual AP 804a operates on a 2 GHz frequency band and the logical channel 806b of the virtual AP 804b operates on a 5 GHz frequency band. At the beginning, the STA 802 is associated with the virtual AP 804a via the channel 806a. During a roaming operation, the STA 802 sends an association message or a re-association message to the virtual AP 804b via the channel 806b. After the AP 804b accepts the association message or the re-association message, the STA 802 performs a security handshake with the AP 804b. On the other hand, the AP 804a may flush available data packets for the STA 802 in its transmission buffer. The AP 804a may forward any new data packets that it receives for the STA 802 to the AP 804b. After that, the STA 802 may start to receive new data packets, including the forwarded new data packets, from the AP 804b. In some implementation of the roaming operation, when the AP 804a flushes data packets in its transmission buffer, an application stream between the STA 802 and the AP 804a may be interrupted. Since a connection between the STA 802 and the AP 804a may be broken before a connection between the STA 802 and the AP 804b is made, a data transfer between the STA 802 and the two APs 804a and 804b may be halted for a while due to a reestablishment of a MAC connection, for example, block acknowledgement session setup. The temporal halt or gap time may cause a TCP timeout and/or an application session reset. In addition, because the AP 804a may flush data packets in the transmission buffer during a roaming, the roaming may case a packet loss or a TCP retransmission.

Figure 9A:
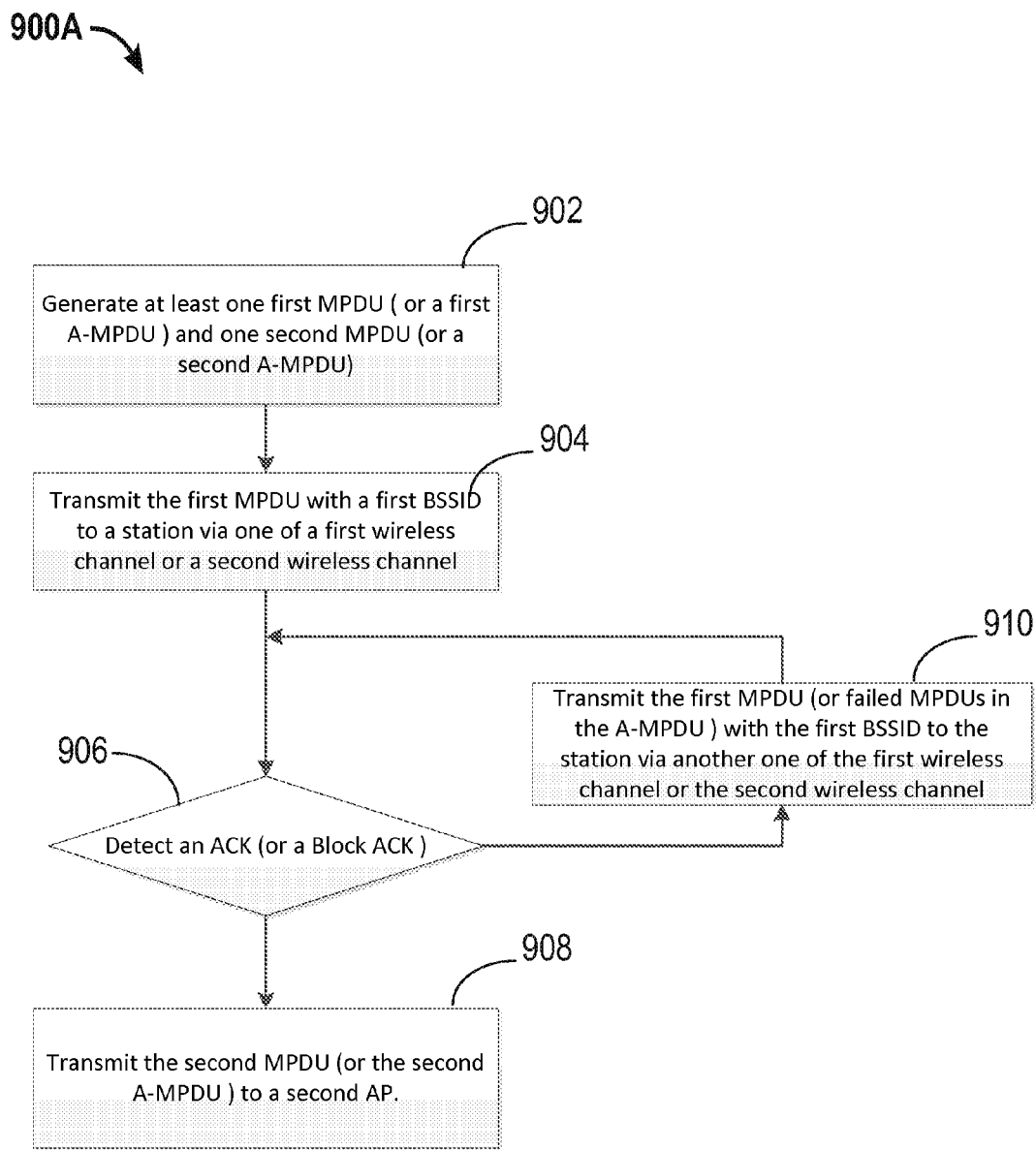
FIG. 9A illustrates a flowchart of an exemplary communication method in accordance with various implementations.
Figure 9B:
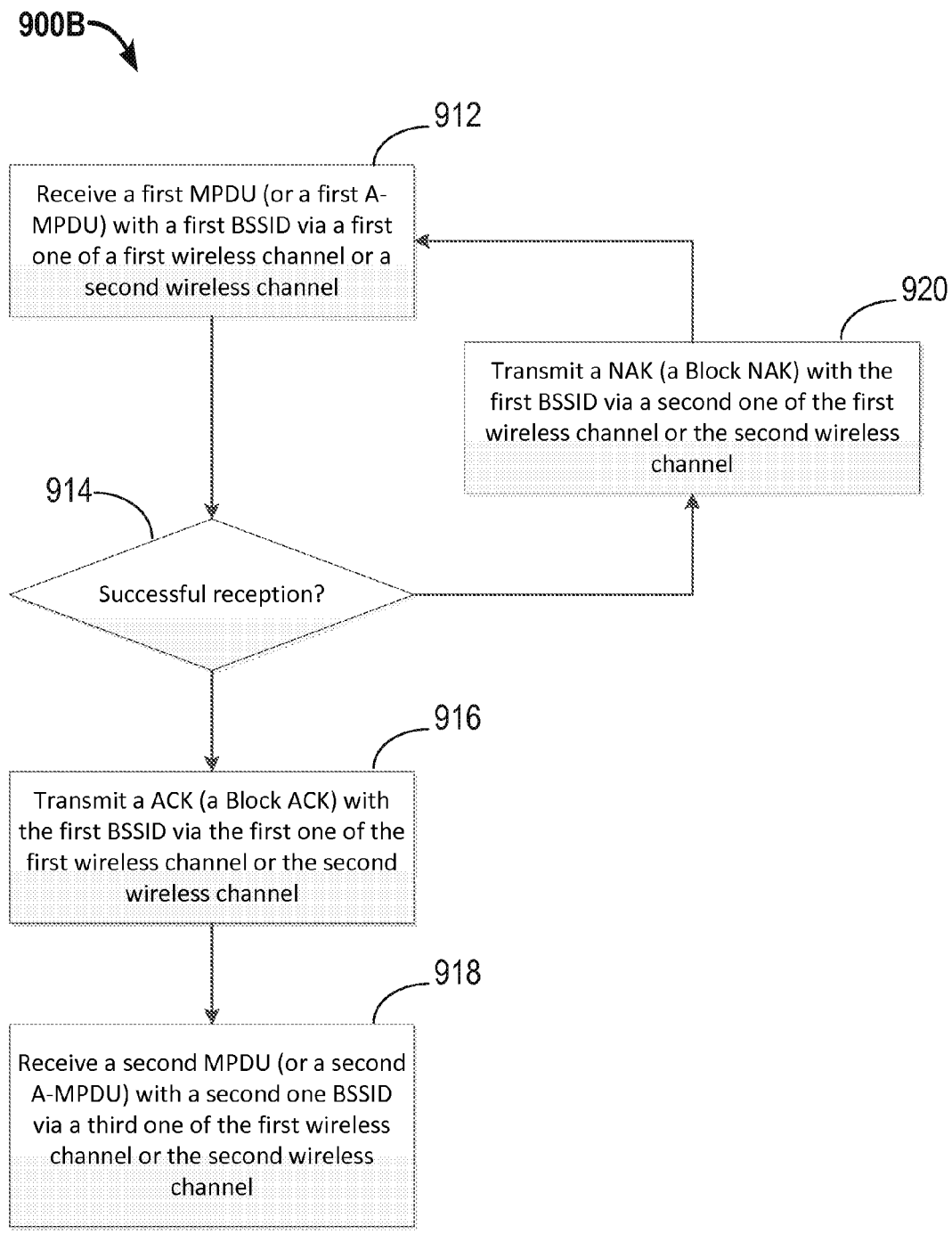
FIG. 9B illustrates a flowchart of another example of a communication method in accordance with various implementations.

FIGS. 9A and 9B show two flowcharts of another exemplary communication method between two APs (e.g., the APs 804a and 804b of FIG. 8) and an STA (e.g., the STA 802 of FIG. 8). The method shown in FIG. 9A may be performed by any one of the two APs 804a and 804b of FIG. 8. The method shown in FIG. 9B may be performed by a STA, for example, the STA 802 of FIG. 8. In one implementation, the two APs 804a and 804b wirelessly communicate with the STA 802 via the two MAC IDs (e.g., BSSIDs) 806a or 806b.

In one implementation, both the AP 804a having a first BSSID and the AP 804b having a second BSSID wirelessly communicate with the STA 802 via two wireless channels 806a and 806b. A wireless channel 806a or 806b may be a physical frequency channel or a logic channel. In some implementations, a BSSID is ties to one wireless channel. A packet with a BSSID may be transmitted via any of available wireless channels.

As shown in FIG. 9A, at block 902, the AP 804a generates a first data packet. At block 904, the AP 804a transmits the first data packet with the first BSSID via at least one of the wireless channel 806a or 806b to the STA 902. In some implementations, the first AP 804a transmits the first data packet via the first wireless channel 806a. After this, at block 906, the AP 804a is configured to detect an acknowledgement from the STA 802 via at least another one of the wireless channel 806a or 806b. In some other implementation, the AP 804a is configured to detect the acknowledgement via the wireless channel 806a. If the AP 804a detects an ACK from the STA 802, the AP 804a transmits a second data packet to the AP 804b at block 908. In another implementation, the first data packet and the second data packet have consecutive sequence numbers. Otherwise, the AP 804a retransmits the first data packet with the first BSSID to the STA 802 via the at least one of the wireless channel 806a or 806b at block 910.

FIG. 9B shows a corresponding flowchart of the method performed by the STA 802. At block 912, the STA 802 is configured to receive the first data packet with the first BSSID transmitted by the AP 804a via the at least one of the wireless channel 806a or 806b. In some implementations, the STA 802 is configured to receive the first data packet via the wireless channel 806a. At block 914, the STA 802 then demodulates and decodes the first data packet and generates an acknowledgement. In some other implementations, the STA 802 is configured to transmit the acknowledgement via the wireless channel 806a. If the STA 802 successfully receives the first data packet, the STA 802 transmits an ACK to the AP 804a via at least another one of the wireless channel 806a or 806b at block 916. Otherwise, the STA 802 sends a NAK to the AP 804a via the at least another one of the wireless channel 806a or 806b at block 920. At block 918, after the STA 802 successfully receives the first data packet from the AP 804a, the STA 802 is configured to receive the second data packet with the second BSSID transmitted by the AP 804b via the wireless channel 806b. In some implementations, the first data packet and the second data packet are configured to have consecutive sequence numbers.

Figure 10:
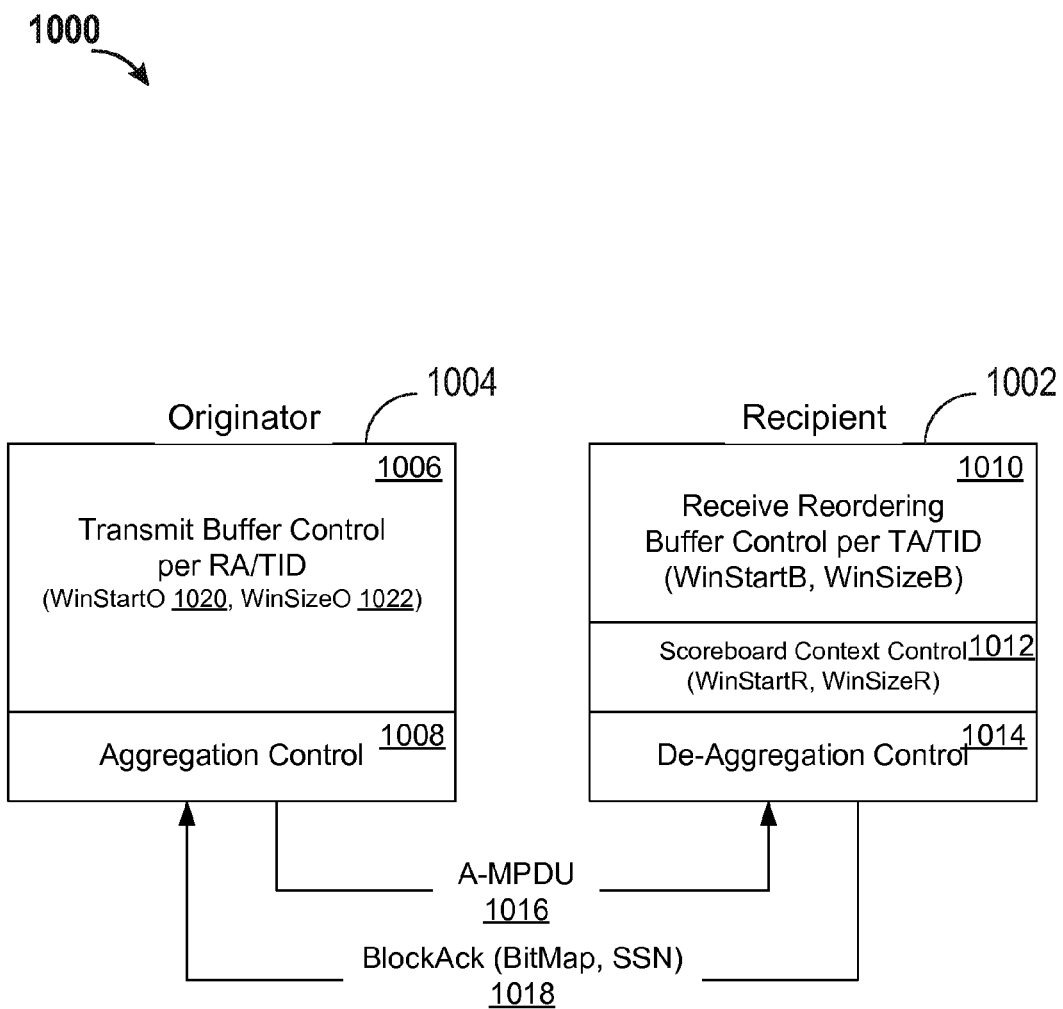
FIG. 10 illustrates a functional block diagram of an example of a block acknowledgement architecture.

FIG. 10 is a functional block diagram of black acknowledgement architecture 1000 for two devices, a recipient 1002 and an originator 1004, that may be deployed within the wireless communication system of FIG. 1. The originator 1004 may be deployed in the AP 104 of FIG. 1, the AP 604 of FIG. 6 or any AP 804 of FIG. 8 and the recipient 1002 is any STA 106 of FIG. 1, any STA 602 of FIG. 6 or the 802 of FIG. 8. The recipient 1002 may be deployed in the AP 104 of FIG. 1, the AP 604 of FIG. 6 or any AP 804 of FIG. 8 and the originator 1004 is any STA 106 of FIG. 1, any STA 602 of FIG. 6 or the 802 of FIG. 8. The recipient 1002 may communicate with the originator 1004 via a wireless channel (e.g., a wireless channel in any frequency band 506 of FIG. 5). As shown in FIG. 10, the originator 1004 includes a transmit buffer control 1006 and an aggregation control 1008. The recipient 1002 includes a receive reordering buffer control 1010, a scoreboard context control 1012 and a de-aggregation control 1012. The originator 1004 transmits at least one A-MPDU or MPDU 1016 to the recipient 1002 and receives at least one response frame or a block acknowledgement (BlockAck) frame 1018 from the recipient 1002.

The transmit buffer control 1006 is configured with at least two parameters, a WinStartO parameter 1020 and a WinSizeO parameter 1022, and submits MPDUs for transmission and the transmit buffer control 1006 releases transmit buffers upon receiving block acknowledgement frames from the recipient 1002. The WinStartO parameter 1020 is defined by a starting sequence number parameter, StartingSequenceNumber, of a transmit window of the originator 1004. The WinSizeO parameter 1022 is defined by a number of buffers that are negotiated in a block acknowledgement agreement.

The aggregation control 1008 creates aggregated medium access control protocol data units (A-MPDUs) from multiple MPDUs. It may adjust an acknowledgement policy field of transmitted QoS data frames in order to solicit BlockAck responses from the recipient 1002.

The receive reordering buffer 1010 is responsible for reordering medium access control service data units (MSDUs) or aggregated MSDUs (A-MSDUs) so that MSDUs or A-MSDUs are eventually passed up to a next MAC process in order of received sequence numbers. The receive reordering buffer 10101 may also be responsible for identifying and discarding duplicate frames (i.e., frames that have the same sequence number as a currently buffered frame) that are part of a block acknowledgement agreement. The receive reordering buffer control 1010 may maintain its own state independent of the scoreboard context control to perform this reordering. In one implementation, the receive reordering buffer control 1010 contains a related control state.

For a block acknowledgement agreement, the recipient 1002 may choose either full-state or partial-state operation. In one implementation, the recipient 1002 simultaneously use full-state operation for some agreements and partial-state operation for other agreements. The scoreboard context control 1012 may store an acknowledgement bitmap containing the current reception status of MSDUs or A-MSDUs for block acknowledgement agreements. Under a full-state operation, a status may be maintained in a statically assigned memory. Under a partial-state operation, a status may be maintained in a cache memory. Therefore, the status information is subject to cache a replacement. This entity provides the bitmap and the value for the Starting Sequence Number, StartingSequenceNumber, field to be sent in BlockAck responses to the originator 1004.

The de-aggregation control 1014 may separate frames contained in the A-MPDU 1016. A received MPDU may be analyzed by the scoreboard context control 1012 as well as by the receive reordering buffer control 1010. A block acknowledgement agreement may be uniquely identified by a tuple of Address 1, Address 2, and traffic identifier (TID) from an add Block Acknowledgement (ADDBA) Response frame that successfully established the black acknowledgement agreement. A STA that corresponds to Address 1 of the ADDBA Response frame may be an originator, such as the originator 1004. A STA that corresponds to Address 2 of the ADDBA Response frame may be a recipient, such as the recipient 1002. Data MPDUs that contain the same values for parameters, such as Address 1, Address 2, and TID, as a successful ADDBA Response frame are related with the block acknowledgement agreement that was established by the successful receipt of that ADDBA Response frame provided that the block acknowledgement agreement is still active.

Figure 11:
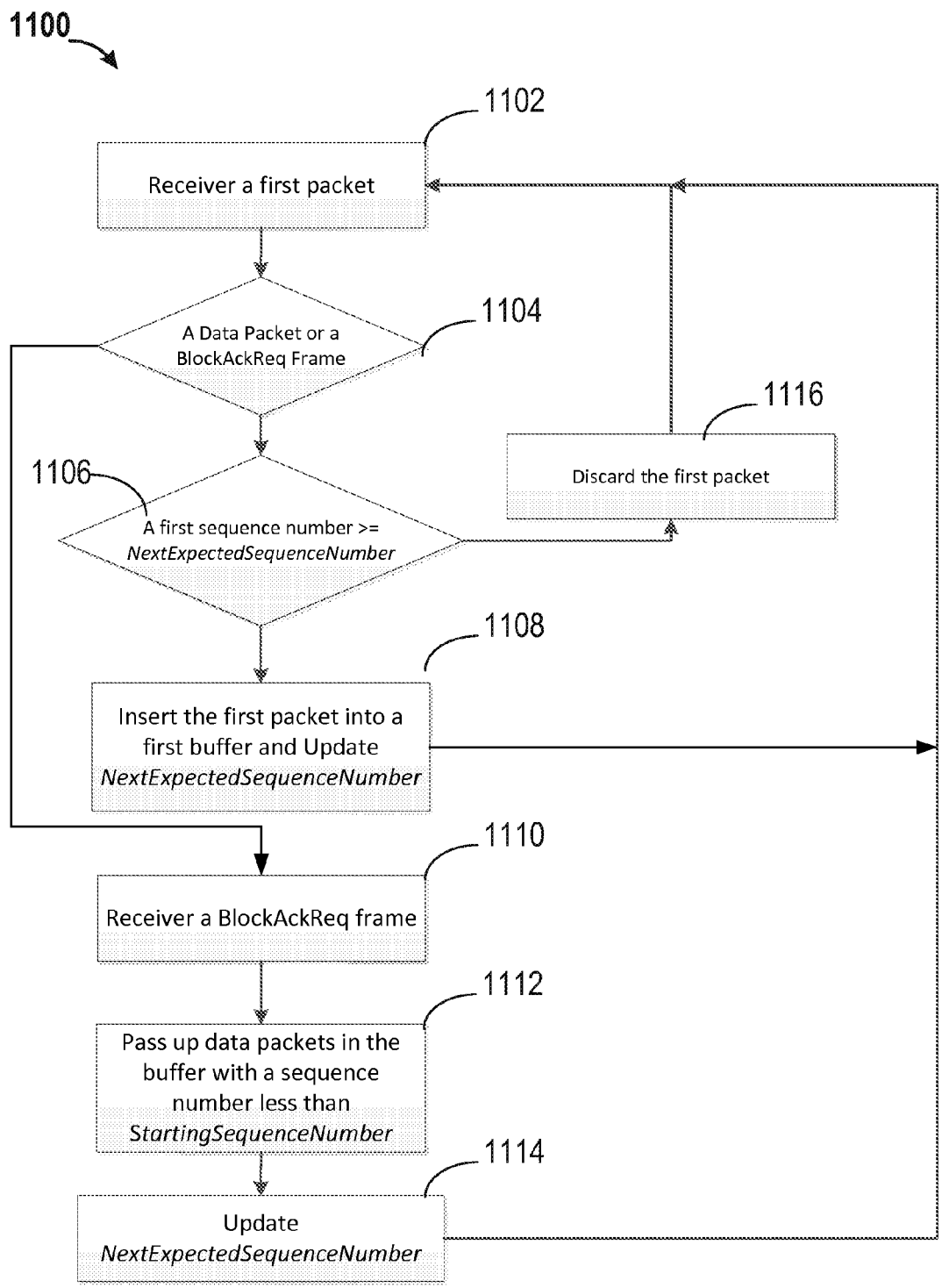
FIG. 11 illustrates a flowchart of an example of a communication method in accordance with various implementations.

FIG. 11 illustrates a flowchart of an exemplary communication method 1100. The method 1100 may be performed by any wireless device, such as the AP 104 or any STA 106 of FIG. 1. The method 1100 comprises a buffer management method. As show in FIG. 11, in one implementation of the buffer management, for each block acknowledgement agreement, a wireless device maintains a parameter of a next expected sequence number, NextExpectedSequenceNumber. When a block acknowledgement agreement is accepted, the NextExpectedSequenceNumber parameter is initialized to 0.

Upon a receipt of a frame by the wireless device at block 1102, the wireless device determines if the frame is a block acknowledgement request (BlockAckReq) frame or a data frame at block 1104. If the wireless device determines that the received frame is a data frame, the wireless device determines if a sequence number of the data frame is older than the NextExpectedSequenceNumber parameter at block 1106. After this, at block 1108, the wireless device buffers a MSDU in a buffer unless the sequence number of the frame is older than the NextExpectedSequenceNumber for a block acknowledgement agreement, in which case the frame is discarded because it is either old or a duplicate.

If the wireless device decides the received frame is a BlockAckReq frame at block 1104, the wireless device decodes and receive the BlockAckReq frame at block 1110. At block 1112, all complete MSDUs and A-MSDUs with sequence numbers lower than a StartingSequenceNumber contained in the BlockAckReq frame may be passed up to a next MAC process. The wireless device may pass up the MSDUs and A-MSDUs starting with the StartingSequenceNumber sequentially until there is an incomplete or missing MSDU or A-MSDU in the buffer.

At block 1114, if no MSDUs or A-MSDUs are passed up to the next MAC process after the receipt of the BlockAckReq frame and the StartingSequenceNumber of the BlockAckReq frame is newer than the NextExpectedSequenceNumber for that Block Ack agreement, then the NextExpectedSequenceNumber for that block acknowledgement agreement is set to the sequence number of the BlockAckReq frame.

If, after an MPDU is received, a receive buffer (e.g., the first buffer or the second buffer) is full, the complete MSDU or A-MSDU with the earliest sequence number may be passed up to the next MAC process. If, after an MPDU is received, the receive buffer is not full, but the sequence number of the complete MSDU or A-MSDU in the buffer with the lowest sequence number is equal to the NextExpectedSequenceNumber for that block acknowledgement agreement, then the MPDU may be passed up to the next MAC process.

Each time that the wireless device passes an MSDU or A-MSDU for a block acknowledgement agreement up to the next MAC process, the NextExpectedSequenceNumber for that block acknowledgement agreement is set to the sequence number of the MSDU or A-MSDU that was passed up to the next MAC process plus one. In another implementation, the apparatus passes MSDUs and A-MSDUs up to the next MAC process in order of increasing sequence number.

Figure 12:
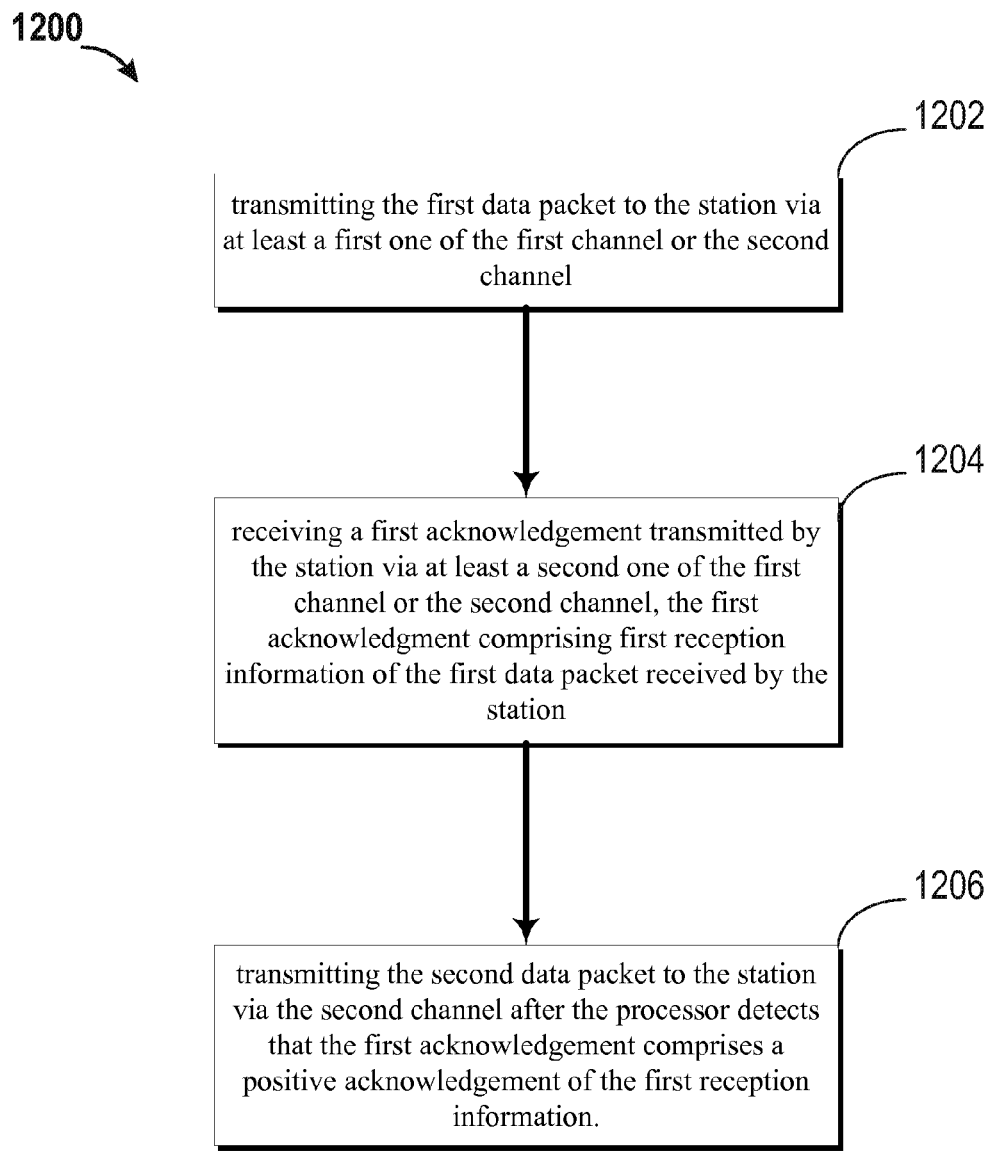
FIG. 12 shows another flowchart of an exemplary communication method in accordance with various implementations.

FIG. 12 is a flowchart of an example of a method 1200 of wireless communication for channel switching. The method may be performed by the AP 104 of FIG. 1. At block 1202, the AP 104 transmits a first data packet to the STA (e.g., any STA 106 of FIG. 1) via at least a first one of a first channel or a second channel. Means for transmitting the first data packet may include a transmitter 210 and an antenna 216 (FIG. 2). At block 1204, the AP 104 receives a first acknowledgement transmitted by the STA 106 via at least a second one of the first channel or the second channel, the first acknowledgment comprising first reception information associated with the first data packet received by the STA 106. A transceiver 214 is activated in response to detecting the reception of the wake-up signal. Means for receiving the first acknowledgement may include a receiver 212 and an antenna 216 (FIG. 2). At block 1206, the AP 104 transmits the second data packet to the STA 106 via the second channel after the processor detects that the first acknowledgement comprises a positive acknowledgement of the first reception information.

Figure 13:
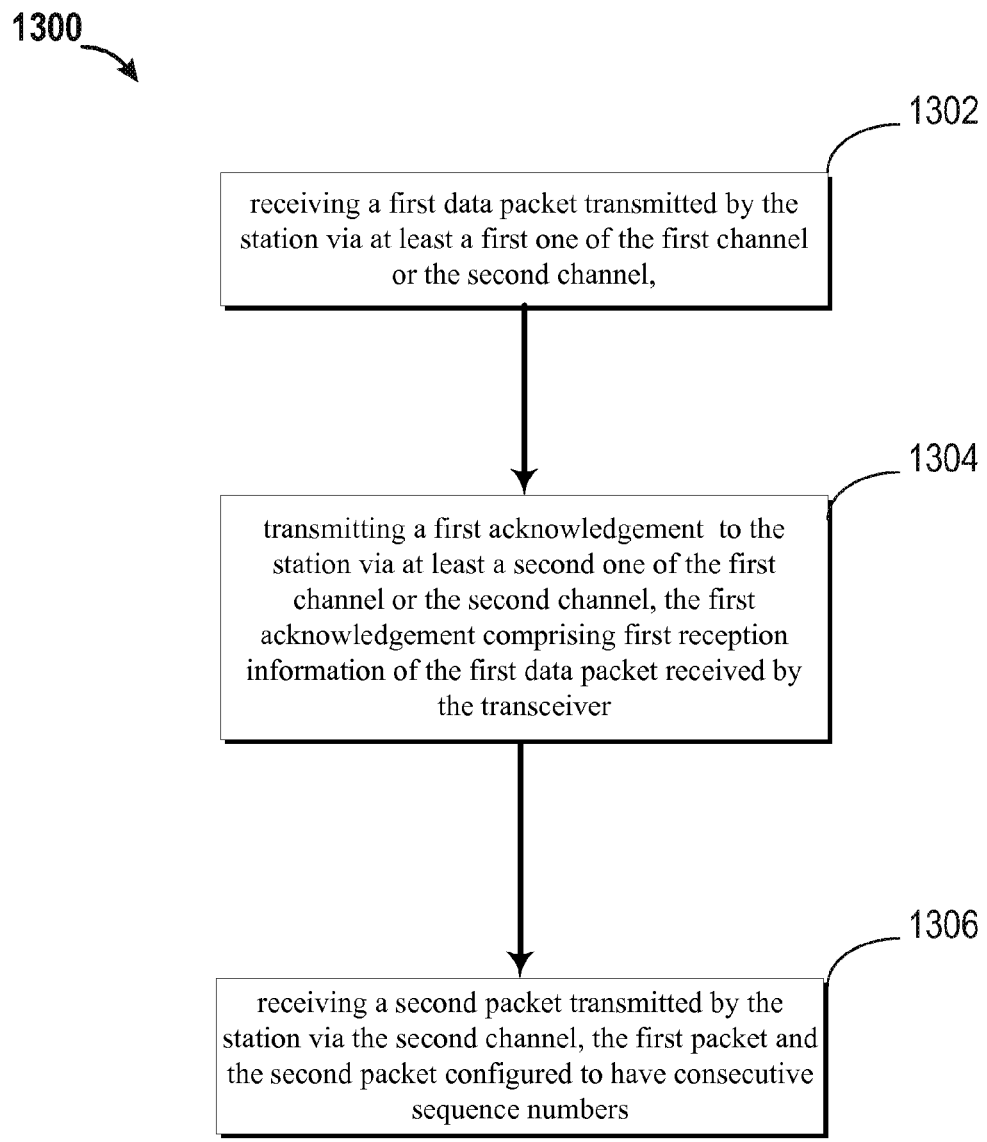
FIG. 13 shows another flowchart of an example of a communication method in accordance with various implementations.

FIG. 13 is a flowchart of another exemplary method 1300 of wireless communication for channel switching. The method may be performed by a STA 106 of FIG. 1. At block 1302, the STA 106 may receive a first data packet transmitted by an AP (for example, the AP 104 of FIG. 1) via at least a first one of the first channel or the second channel. Means for receiving the first data packet may include a receiver 212 and an antenna 216 (FIG. 2). At block 1304, the STA 106 transmits a first acknowledgement to the AP 104 via at least a second one of the first channel or the second channel, the first acknowledgement comprising first reception information associated with the first data packet received by the transceiver. Means for transmitting the first acknowledgement may include a transmitter 210 and an antenna 216. At block 1306, the STA 106 receives a second packet transmitted by the AP 104 via the second channel, the first packet and the second packet configured to have consecutive sequence numbers. Means for receiving the second packet may include a receiver 212 and an antenna 216.

Figure 14:
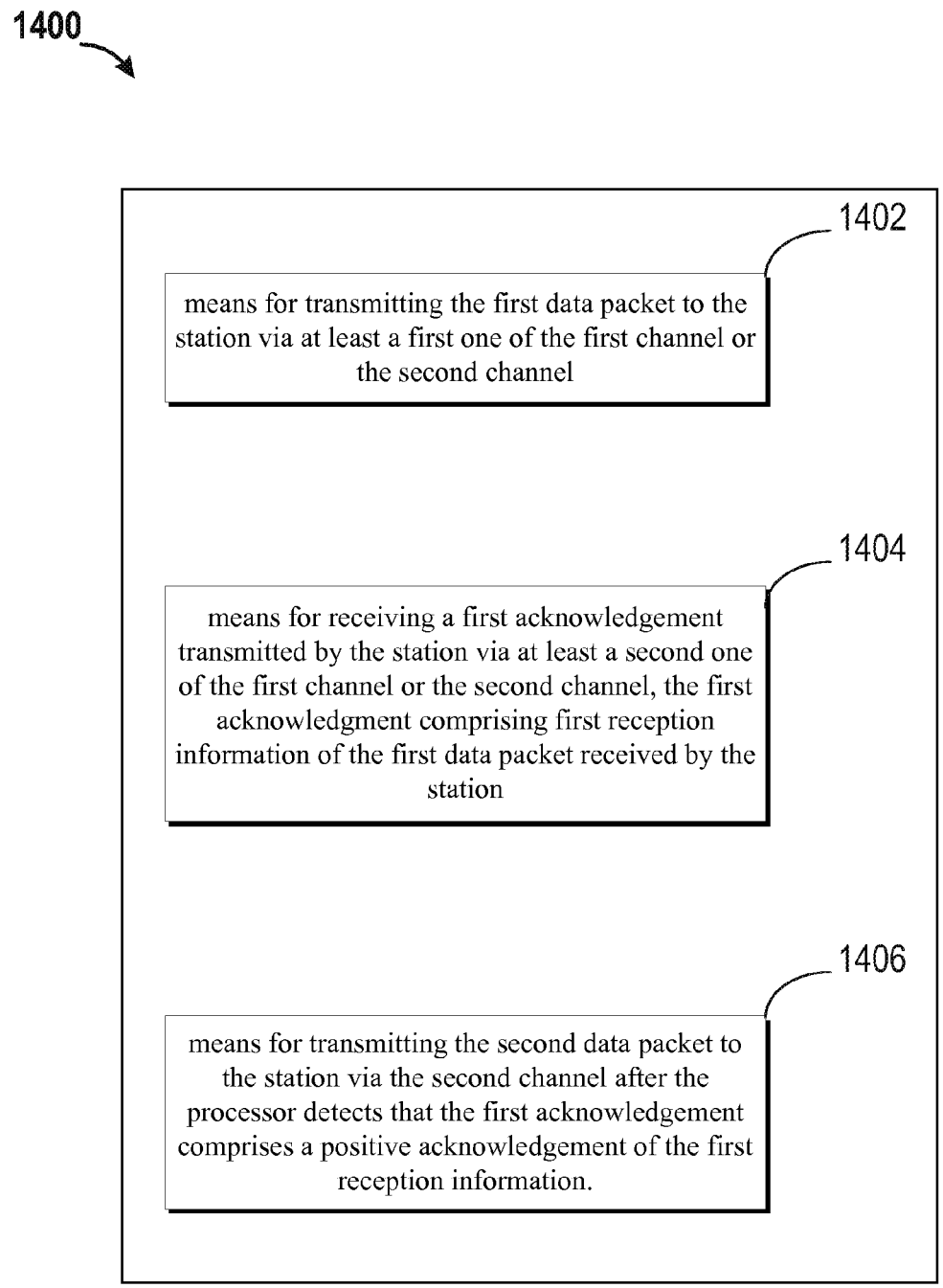
FIG. 14 shows a functional block diagram of an exemplary communication system.

FIG. 14 is a functional block diagram of an exemplary wireless communication system 1400 for channel switching. The communication system 1400 may an exemplary implementation of the AP 104 of FIG. 1. The communication 1400 includes a means 1402 for transmitting a first data packet to the station via at least a first one of the first channel or the second channel, a means 1402 for receiving a first acknowledgement transmitted by the station via at least a second one of the first channel or the second channel, the first acknowledgment comprising first reception information associated with the first data packet received by the station, and a means 1406 for transmitting the second data packet to the station via the second channel after the processor detects that the first acknowledgement comprises a positive acknowledgement of the first reception information. The means 1402 for transmitting the first data packet may include a transmitter 210 and an antenna 216 (FIG. 2). The means 1404 for receiving the first acknowledgement may include a receiver 212 and an antenna 216 (FIG. 2). The means 1406 for transmitting the first data packet may also include a transmitter 210 and an antenna 216 (FIG. 2).

Figure 15:
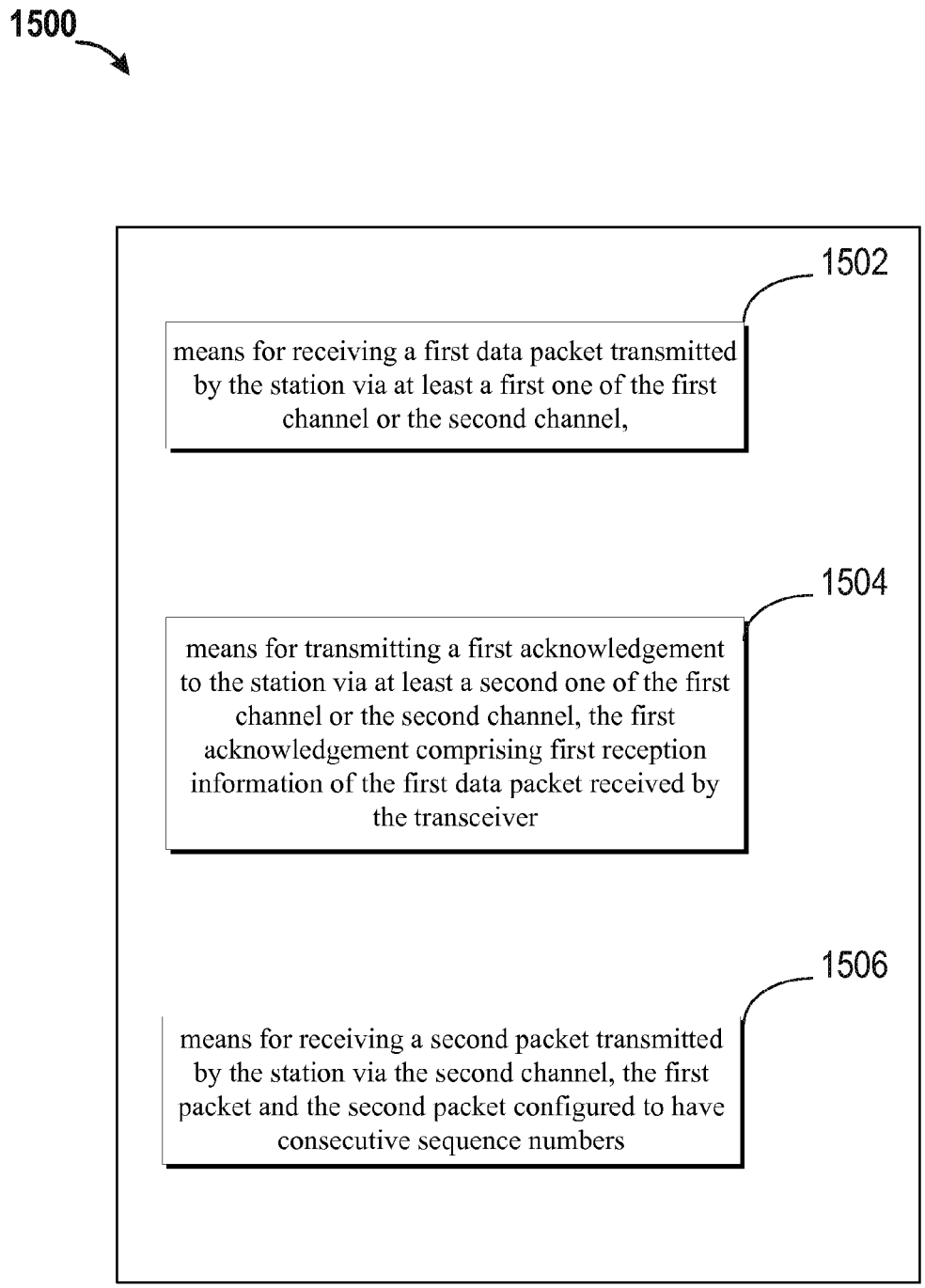
FIG. 15 shows a functional block diagram of another exemplary communication system.

FIG. 15 is a functional block diagram of an exemplary wireless communication system 1500 for channel switching. The communication system 1500 may an exemplary implementation of a STA 106 of FIG. 1. The communication 1500 includes a means 1502 for receiving a first data packet transmitted by the station via at least a first one of the first channel or the second channel, a means 1504 for transmitting a first acknowledgement to the station via at least a second one of the first channel or the second channel, the first acknowledgement comprising first reception information associated with the first data packet received by the transceiver, and a means 1506 for receiving a second packet transmitted by the station via the second channel, the first packet and the second packet configured to have consecutive sequence numbers. The means 1502 for receiving the first data packet may include a receiver 212 and an antenna 216 (FIG. 2). The means 1504 for transmitting the first acknowledgement may include a transmitter 210 and an antenna 216. The means 1506 for receiving the second packet may include a receiver 212 and an antenna 216.

Other implementations are possible. For example, in one implementation, there are two APs, each AP operating on one of two frequency bands. A STA may perform a band and/or channel switching during its communication to the two APs.

In another implementation, during a band and/or channel switching, a data stream is a downlink data stream transferred from at least one AP to a STA. The AP is on a transmission side of the downlink data stream and the STA is on a recipient side of the downlink data stream. In some implementations, the data stream is an uplink data stream transferred from a STA to at least one AP. In some other implementations, the data stream is a peer-to-peer data stream.

In yet another implementation, during a band and/or channel switching, a STA uses a single MAC address on at least two frequency bands and/or channels when the STA communicates to at least one AP. In some implementations, the STA uses at least two different MAC addresses on the at least two frequency bands and/or channels.

In one implementation, a band switching is a per-data-stream switching such that most of related frequency bands and/or channels are operational during a band switching operation. Each data stream is identified by a direction (downlink and uplink) and/or a TID. A transfer of one data stream from one frequency band to another frequency band doesn't affect on which band another stream is operational.

In another implementation, a band switching is a whole STA switching such that a frequency band that a STA switches from is not operational after a band switching. In this case, a transfer of one data stream indicates that all data streams of both directions and all TIDs are operational on a new frequency band that the STA switches to.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. An apparatus for wirelessly communicating with a communication system, the apparatus comprising:
    a memory unit configured to store a first data packet and a second data packet, the first data packet and the second data packet having consecutive sequence numbers;
    a processor operationally coupled to the memory unit and configured to retrieve the first data packet and the second data packet from the memory unit; and
    a transceiver operationally coupled to the processor, the transceiver including a wireless first channel and a wireless second channel to communicate data, the apparatus being configured to transmit the first data packet to the communication system via the first channel, to receive via the first channel a first acknowledgement from the communication system comprising reception information associated with the first data packet, and to transmit the second data packet to another communication system via the second channel based on a determination that the first acknowledgement includes reception information that indicates successful reception of the first data packet.

2. The apparatus of claim 1, wherein the first channel is configured to communicate data at a first frequency and the second channel is configured to communicate data at a second frequency, the second frequency being different than the first frequency.

3. The apparatus of claim 1, wherein the communication system simultaneously monitors both the first channel and the second channel.

4. The apparatus of claim 1, wherein when the apparatus receives that the first acknowledgement indicates the first data packet was not received, the apparatus is further configured to
    re-transmit the first data packet to the communication system via at least one of the first channel or the second channel; and
    receive a second acknowledgement via the first or second channel that was used to re-transmit the first data packet, the second acknowledgement including reception information that indicates reception status of the re-transmitted first data packet by the communication system.

5. The apparatus of claim 1, wherein when the apparatus fails to receive the first acknowledgement for a length of time, the apparatus is further configured to
    re-transmit the first data packet to the communication system via at least one of the first channel or the second channel; and
    receive a second acknowledgement via the first or second channel that was used to re-transmit the first data packet, the second acknowledgement including reception information that indicates reception status of the re-transmitted first data packet by the communication system.

6. The apparatus of claim 1, wherein the memory unit is further configured to store a third data packet, wherein the processor is further configured to retrieve the third packet, and wherein the apparatus is further configured to
    transmit the first packet and the third packet to the communication system via the first channel; and
    receive via the first channel a second acknowledgement comprising reception information associated with the first data packet and the third data packet from the communication system.

7. The apparatus of claim 6, wherein when the apparatus receives that the second acknowledgement indicates that the first data packet was not received, the apparatus is further configured to
    re-transmit the first data packet to the communication system via at least one of the first channel or the second channel; and
    receive a third acknowledgement via the first or second channel that was used to re-transmit the first data packet, the third acknowledgement including reception information that indicates reception status of the re-transmitted first data packet by the communication system.

8. The apparatus of claim 6, wherein when the apparatus fails to receive the second acknowledgement for a length of time, the apparatus is further configured to
    re-transmit the first packet and the third packet to the communication system at least one of the first channel or the second channel; and
    receive a third acknowledgement via the first or second channel that was used to re-transmit the first data packet, the third acknowledgement including reception information that indicates reception status of the re-transmitted first data packet by the communication system.

9. The apparatus of claim 1, wherein the apparatus shares at least the transceiver with the another communication system.

10. The apparatus of claim 1, wherein the communication system comprises a user station and the other communication system comprises an access point.

11. A method of tirelessly communicating with a communication system via a first wireless channel and a second wireless channel, the method comprising:
    transmitting a first data packet to the communication system via the first channel;
    receiving a first acknowledgement from the communication system via the first channel, the first acknowledgement including reception information that indicates whether a successful reception of the first data packet occurred; and
    transmitting a second data packet to another communication system via the second channel based on a determination that the first acknowledgement indicates a successful reception of the first data packet.

12. The method of claim 11, wherein transmitting the first data packet comprises transmitting the first data packet to the communication system via the first channel at a first frequency, wherein receiving the first acknowledgement comprises receiving the first acknowledgement from the communication system via the first channel, and wherein transmitting the second data packet comprises transmitting the second data packet via the second channel at a second frequency.

13. The method of claim 11, wherein the communication system simultaneously monitors the first wireless channel and the second wireless channel.

14. The method of claim 11, wherein the method further comprises:
- re-transmitting the first data packet to the communication system via the first channel when the first acknowledgement indicates that the first data packet was not received; and
- receiving a second acknowledgement from the communication system via the first channel, the second acknowledgement including reception information associated with the re-transmitted first data packet.

15. The method of claim 11, wherein the method further comprises:
- re-transmitting the first data packet to the communication system the first channel when the first acknowledgement was not received for a length of time; and
- receiving a second acknowledgement from the communication system via the first channel, the second acknowledgement comprising reception information associated with the re-transmitted first data packet.

16. The method of claim 11, wherein the method further comprises:
- transmitting the first packet and a third packet to the communication system via the first channel; and
- receive a second acknowledgement from the communication system via the first channel, the second acknowledgement including reception information associated with at least one of the first data packet or a third data packet.

17. The method of claim 16, wherein the method further comprises:
- re-transmitting the first data packet to the communication system via the first channel when the second acknowledgement indicates that the first data packet was not successfully received; and
- receiving a third acknowledgement from the communication system via the first channel, the third acknowledgement including reception information associated with the re-transmitted first data packet.

18. The method of claim 16, wherein the method further comprises:
- re-transmitting the first packet and the third packet to the communication system via the first channel when the second acknowledgement was not successfully received for a length of time; and
- receiving a third acknowledgement from the communication system via the first channel, the third acknowledgement including third reception information associated with the at least one of the first data packet or the third data packet.

19. The method of claim 11, wherein the communication system comprises a user station and the other communication system comprises an access point.

20. An apparatus for of wirelessly communicating with a communication system via a wireless first channel and a wireless second channel, the apparatus comprising:
- means for storing a first data packet and a second data packet, the first data packet and the second data packet having consecutive sequence numbers;
- means for processing operationally coupled to the storing means and configured to retrieve the first data packet and the second data packet from the storing means;
- means for transmitting a first data packet to the communication system via the first channel;
- means for receiving a first acknowledgement from the communication system via the first channel, the first acknowledgement including reception information associated with the first data packet; and
- means for transmitting the second data packet to another communication system via the second channel based on a determination that the first acknowledgement includes a positive acknowledgement of reception of the first data packet.

21. The apparatus of claim 20, wherein the means for storing comprises a memory unit, wherein the means for processing comprises a processor, wherein the means for transmitting the first data packet comprises a transmitter, wherein the means for receiving the first acknowledgement comprises a receiver, and the means for transmitting the second data packet comprises the transmitter.

22. The apparatus of claim 20, wherein the communication system comprises a user station and the other communication system comprises an access point.

23. A non-transitory computer-readable medium comprising code that, when executed, causes an apparatus to:
- transmit a first data packet to the communication system via a first channel,
- receive a first acknowledgement from the communication system via the first channel, the first acknowledgement comprising reception information associated with the first data packet, and
- determine if the first acknowledgement indicates a successful transmission of the first data packet; and
- transmit a second data packet to another communication system via the second channel based on a determination that the transmission of the first data packet was successful.

* * * * *